US011443275B1

(12) United States Patent
Prakash et al.

(10) Patent No.: US 11,443,275 B1
(45) Date of Patent: Sep. 13, 2022

(54) MAINTAINING ACCURATE CART-STATE USING AUTO-GENERATED SENSOR DATA

(71) Applicant: Amazon Technologies, Inc., Seattle, WA (US)

(72) Inventors: Uday Prakash, Seattle, WA (US); Casey Louis Thurston, Suquamish, WA (US); Kenneth King-Fung Lee, Seattle, WA (US); Michal Tucki, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 365 days.

(21) Appl. No.: 15/842,579

(22) Filed: Dec. 14, 2017

(51) Int. Cl.
*G06Q 10/08* (2012.01)
*G06Q 30/06* (2012.01)
*G06Q 20/22* (2012.01)

(52) U.S. Cl.
CPC .......... *G06Q 10/087* (2013.01); *G06Q 20/22* (2013.01); *G06Q 30/0639* (2013.01); *G06Q 30/0641* (2013.01)

(58) Field of Classification Search
CPC .............. G01G 19/415; G01G 19/414; G01G 19/4144; G01G 21/22; G06F 9/542; G06Q 30/06; G06Q 10/087; G06Q 20/209; G06Q 10/08; G06K 7/10445; G08B 13/2451; G08B 3/10; H04W 4/029; Y02P 90/14
See application file for complete search history.

(56) References Cited

U.S. PATENT DOCUMENTS

| 8,839,358 | B2 * | 9/2014 | Strauss | .................. G06F 21/40 |
| | | | | 726/2 |
| 9,117,106 | B2 | 8/2015 | Dedeoglu et al. | |
| 9,235,928 | B2 | 1/2016 | Medioni et al. | |
| 9,473,747 | B2 | 10/2016 | Kobres et al. | |
| 2007/0112671 | A1 * | 5/2007 | Rowan | .................. G06Q 20/10 |
| | | | | 705/39 |
| 2010/0169716 | A1 * | 7/2010 | Ben-Yehuda | ......... G06F 9/3842 |
| | | | | 714/48 |
| 2010/0274597 | A1 * | 10/2010 | Dill | ........................ G06Q 30/06 |
| | | | | 705/7.29 |
| 2011/0035788 | A1 * | 2/2011 | White | .................. H04L 9/3231 |
| | | | | 726/4 |

(Continued)

*Primary Examiner* — Fahd A Obeid
*Assistant Examiner* — Avia Salman
(74) *Attorney, Agent, or Firm* — Lee & Hayes, P.C.

(57) ABSTRACT

This disclosure describes techniques for determining whether a transaction may be finalized with a user that exits a facility. To do so, the inventory management system may first determine whether the inventory management is to resolve any events prior to finalizing the transaction. In some instances, the inventory management system may refrain from finalizing a transaction with a user that exits the facility if the user is associated with a low-confidence result/event, if the user remains a candidate user for an unresolved event, or if a global-blocking event is in place at the time of the user's exit. In some instances, meanwhile, the transaction with a user may be finalized upon the user's exit of the facility if the user is associated with high-confidence events/results, is not associated with any low-confidence events/results, is not a candidate user for an unresolved event, and if no global-blocking event is in place at the time of exit.

20 Claims, 12 Drawing Sheets

(56) References Cited

U.S. PATENT DOCUMENTS

| | | | |
|---|---|---|---|
| 2012/0179939 A1* | 7/2012 | Collins, Jr. | G07F 19/207 |
| | | | 714/57 |
| 2013/0284806 A1 | 10/2013 | Margalit | |
| 2015/0019391 A1* | 1/2015 | Kumar | G06Q 10/087 |
| | | | 705/28 |
| 2015/0029339 A1* | 1/2015 | Kobres | H04N 7/181 |
| | | | 348/150 |
| 2015/0206111 A1* | 7/2015 | Sugiyama | G06Q 20/208 |
| | | | 705/14.66 |
| 2016/0328767 A1* | 11/2016 | Bonner | G06F 3/0482 |
| 2017/0330206 A1* | 11/2017 | Yada | G06Q 30/0201 |

* cited by examiner

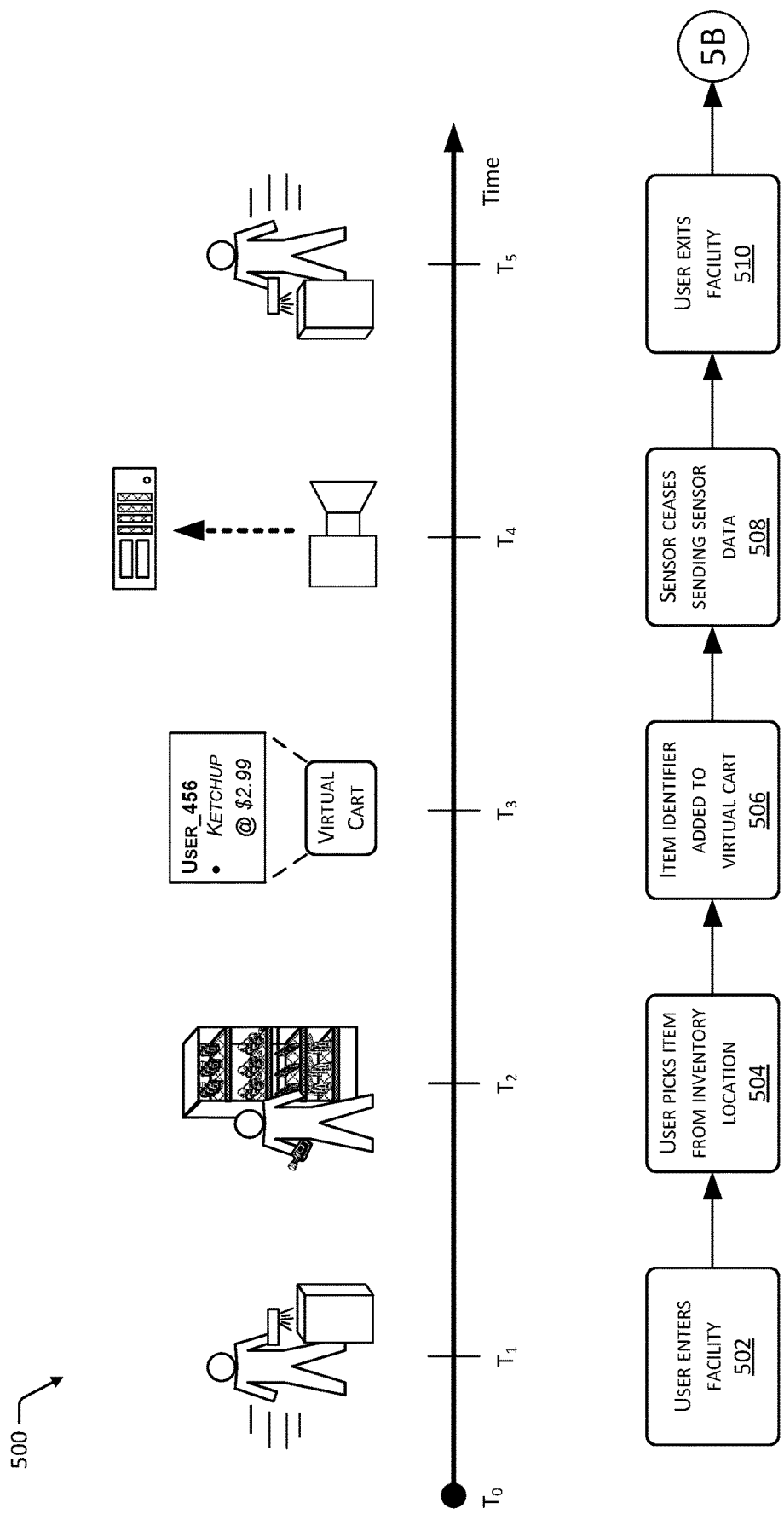

MAINTAINING ACCURATE CART-STATE USING AUTO-GENERATED SENSOR DATA

BACKGROUND

Retailers, wholesalers, and other product distributors typically maintain an inventory of various items that may be ordered, purchased, leased, borrowed, rented, viewed, and so forth, by clients or customers. For example, an e-commerce website may maintain inventory in a fulfillment center. When a customer orders an item, the item is picked from inventory, routed to a packing station, and packed and shipped to the customer. Likewise, physical stores maintain inventory in customer-accessible areas, such as in a shopping area, and customers can pick items from inventory and take them to a cashier for purchase, rental, and so forth. Many physical stores also maintain inventory in a storage area, fulfillment center, or other facility that can be used to replenish inventory located in the shopping areas or to satisfy orders for items that are placed through other channels (e.g., e-commerce). Other examples of entities that maintain facilities holding inventory include libraries, museums, rental centers, and the like. In each instance, for an item to be moved from one location to another, the item is picked from its current location and transitioned to a new location, users may move about within the facility, and so forth. It is often desirable to generate information about events occurring in the facility.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 5A-B collectively illustrate a schematic diagram where a transaction with a user is not finalized upon the user exiting the facility given that a global-blocking event exists at a time of exit. Therefore, transactions with exiting users are not finalized at least until the global-blocking event is resolved, as in the illustrated example.

DETAILED DESCRIPTION

Figure 1A:
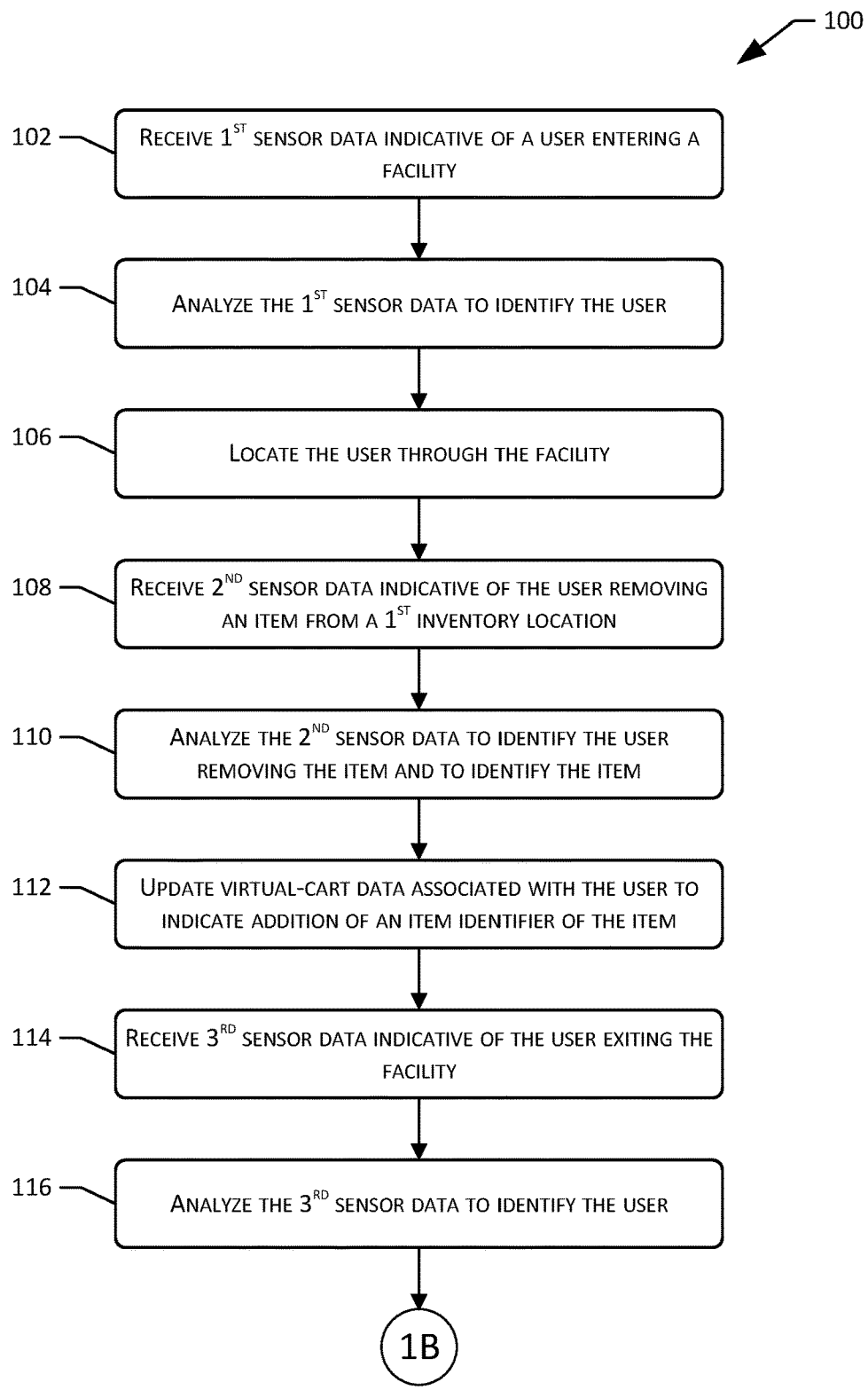
FIGS. 1A-B illustrates a flow diagram of an example process for determining whether a transaction may be finalized with a user who has exited a facility, or whether or one or more events are to be finalized prior to finalizing the transaction with the user.

This disclosure describes, in part, systems and techniques for detecting events occurring within a materials handling facility (facility) and updating virtual shopping carts of respective users based on the detected events. The facility may include, or have access to, an inventory management system. The inventory management system may be configured to maintain information about items, users, condition of the facility, and so forth. For example, the inventory management system may maintain data indicative of a result of different events that occur within the facility, such as what items a particular user is ordered to pick, location of the particular user, availability of a user providing support services to others, requests for assistance, environmental status of the facility, and so forth. As such, as used herein a "result" of an event may comprise data representing some inference regarding the event, which may represent a particular value, indication that the event is inconclusive, or the like. That is, the result of an event may comprise any information deduced from automated or manual analysis of sensor data at least partly representative of the event. Further, it is to be appreciated that analysis of first data associated with an event may produce a first result. However, analysis of second data associated with the same event may produce a second result. Further, because these results are essentially calculated hypotheses of what the actual real-world result of the event was, the produced results may differ from one another and, potentially, from the real-world result of the real-world event.

Operation of the inventory management system may be supported by sensor data acquired by one or more sensors. The sensor data may include image data acquired by imaging devices such as cameras, information acquired from radio frequency tags, weight sensors, and so forth.

The inventory management system may determine, using the sensor data, occurrence of one or more events within the facility. Events may involve interactions between one or more items, inventory locations, users, totes, robots, changes in sensor operation, movement of objects, and so forth. For example, a user may remove an item from or return an item to an inventory location. In another example, two or more users may move past one another or attempt to access the same inventory location contemporaneously. When the system described herein detects sensor data indicative of an event, the system may generate an event record that indicates the occurrence of the event.

The inventory management system may be configured to generate output data providing information indicative of the event using one or more machine learning or automated systems to process the sensor data. For example, artificial neural networks, classifiers, and so forth, may be used to process the image data of an event and identify the item that was removed from the inventory location, identify the users after they move apart, disambiguate if the user picked or placed an item from an inventory location, and so forth.

The inventory management system may be automated to provide the output data during operation. For example, the inventory management system may automatically identify an item removed from an inventory location as well as a user that removed the item. In response, the inventory management system may automatically update a virtual shopping cart of that particular user. However, in some situations, it may be advantageous to use human input to generate or confirm the output data. In these situations, inquiry data may be provided to an associate service that provides the inquiry data to one or more devices associated with one or more associates supporting operation of the facility.

The inquiry data may comprise at least a portion of the sensor data associated with the event. For example, the sensor data may comprise image data such as a video clip or still image showing the user interacting with an item. An associate user interface presents at least a portion of the image data and generates response data indicative of the input from the associates. In some implementations, the inquiry data may also comprise tentative results of the events. For example, the tentative results may comprise the possible results associated with the event as generated by the inventory management system. Continuing the example, tentative results may comprise a list of the possible items the user may be interacting with. The response data may comprise data indicative of a selection by the associate of one or more of the tentative results. The response data may then be used to update the virtual shopping cart of a user, similar to how a virtual shopping cart may be updated after automatically determining this information.

As noted above, the system may use sensor data to determine occurrence of an event, such as a user picking an item from a shelf in the facility. The system may use this sensor data to associate a result to an event record associated with this event, such as indication of an item identifier of the item picked, a number of the total items picked, a user that picked the item, etc. Further, the system may calculate a confidence level associated with the determined result. If this confidence level is higher than a threshold confidence level, the system may store a result of the event. If, however, the confidence level is lower than the threshold confidence level, then the system may request input from a human user (e.g., an "associate"). In either instance, a final result may be determined and a virtual shopping cart may be correspondingly updated. For instance, if the inventory management system determines with a threshold level of confidence that a particular user picked a particular box of cereal from a shelf of the facility, or if a human associate manually makes that determination, the inventory management system may update the virtual shopping cart of that user to indicate this particular box of cereal. Therefore, when the user requests to finalize a transaction with a provider of the system (e.g., request to pay for items in the user's shopping cart), the inventory management system may charge a payment instrument of the user for a cost of all items designated in the virtual shopping cart, including the box of cereal. For instance, the user may have previously associated an identifier of a payment instrument (e.g., credit card, debit card, stored-value card, etc.) with the inventory management system such that the inventory management system may charge that payment instrument upon the user exiting the facility.

In some instances, the inventory management system may determine a first result of an event and, thereafter, modify that result (e.g., generate a new result for that event). For instance, as mentioned above, the sensor data may be analyzed to automatically determine information about an event, such as that a particular user grabbed a particular box of cereal (e.g., "Acme Cereal"). If, however, the confidence level associated with this result is less than the threshold confidence level, then the sensor data may be sent to a client computing device for analysis by a human user. The human user may then analyze the sensor data (e.g., by watching video acquired by one or more cameras within the environment) to determine a different result of the event, such as the same or a different user selecting a different type of cereal than initially determined (e.g., "Oatmeal Cereal").

In some instances, the inventory management system may identify a user when the user enters a facility and may begin locating the user through the facility to determine events involving the user. For example, the facility may include an entry/exit kiosk that includes a scanner or other type of image sensor configured to read an image that uniquely identifies the user. For example, the user may use a mobile device to present the image for reading by the scanner. The image may comprise a QR code, a barcode, a unique alphanumeric string, or the like. Further, while the above example describes using a visual image to aid in identification of the user, in other instances the user may speak his or her credentials, may be identified using facial-recognition techniques applied to image data of the user entering the facility, or the like. In short, the inventory management system may identify the user entering the facility in any number of ways.

After the user has been identified, the inventory management system may locate the user throughout the facility, with the user's knowledge and consent. By maintaining location data of the user, the inventory management system is able to accurately associate events that take place within the facility with the user. The inventory management system may identify these events using image data of the user, image data of inventory locations within the facility, weight sensors, and/or any other type of data acquired by any other type of sensor within the environment.

As the user picks items from different inventory locations in the facility, respective item identifiers and information regarding these items (e.g., cost, quantity, time of the event, etc.) may be added to a virtual shopping cart associated with the user. Similarly, these item identifiers may be removed as the user places items back on the inventory locations, such as shelves. For example, if a user takes two bottles of syrup from an inventory shelf, the inventory management system may add an indication to the virtual shopping cart of the user indicating that the user is now in possession of two bottles of syrup. As noted above and below, the inventory management system may analyze sensor data within the facility to make this determination. Similarly, if the user returns one of the bottles of syrup back to the shelf, the inventory management system may identify this return and, thus, may remove an indication to the bottle of syrup from the virtual cart of the user.

The inventory management system may continue to modify the state/contents of the virtual shopping cart of the user and the user continues to interact with items during the shopping session of the user. Further, when the user has finished shopping the user may exit the facility, with the inventory management system identifying the user upon exit. Again, the user may scan his or her unique image at the entry/exit kiosk, may be identified using facial-recognition or voice-recognition, or may be identified in any other manner. After determining that the user has exited, in some instances the contents of the virtual cart may be determined and a payment instrument previously associated with a profile of the identified user may be charged for a total price of the contents of the virtual cart of the user. Further, the system may generate and send receipt data indicative of the transaction to a device of the user also previously associated with the profile of the user.

Prior to finalizing the transaction with the exiting user, however, the inventory management system may first determine whether the transaction is eligible to be finalized or whether the inventory management is to resolve one or more other events prior to finalizing the transaction. In some instances, the inventory management system may refrain from finalizing a transaction with a user that exits the facility if the user is associated with a low-confidence result or event, if the user remains a candidate user for an unresolved event, if a global-blocking event is in place at the time of the user's exit, and/or the like. In some instances, meanwhile, the transaction with a user may be finalized upon the user's exit of the facility of the user is associated with high-confidence events/results, is not associated with any low-confidence events/results, is not a candidate user for an unresolved event, and if no global-blocking event is in place at the time of exit.

Therefore, upon identifying a user exiting the facility, the inventory management system may determine whether a transaction with the user may be finalized or whether the inventory management system is to first resolve one or more events prior to finalizing the transaction. First, the inventory management system may determine whether a global-blocking event is in place at the time of exit. If so, then the inventory management system may await removal and processing of the global-blocking event prior to finalizing the transaction with the user. In some instances, a global-blocking event precludes finalizing transactions with any users, given that certain information may be missing that could affect each user within the facility. For example, if one or more sensors cease uploading their respective sensor data to the inventory management system (e.g., because the sensors go down, the network goes down, or the like), then the inventory management system may store an indication that a global-blocking event is in place. That is, because the missing sensor data may indicate certain events that could possibly involve different users within the facility, the inventory management may away the sensor data and may process this data prior to finalizing transactions with users that exit the facility. Thereafter, when the sensor(s) again begin sending their respective sensor data, and the sensor data received by the inventory management system is caught up, then the inventory management system may remove the global-blocking event and may proceed to finalize transactions with users that have exited the facility or that subsequently exit the facility. In some instances, the inventory management system may store a sensor-data state-invariant time indicating a further progression in time at which sensor data from all sensors within the facility has been received. Therefore, in some instances transactions with users that exit the facility at time prior to the sensor-data state-invariant time may not be finalized until the sensor-data state-invariant time passes the time of the respective user's exit. Further, while one example is described, the inventory management system may store an indication of a global-blocking event based on multiple other reasons.

In another example, the global-blocking event may comprise a delay in a locating service successfully locating users through the facility. For instance, if the locating service stores an indication that it has successfully located each user within the facility up to a certain time (e.g., 2:05 pm), then a global-blocking event may exist for any transactions occurring past this certain time.

Further, upon identifying a user exiting the facility, the inventory management system may determine whether the user is a candidate user for any events that have yet to be resolved. That is, as noted above, the inventory management system may use sensor data to identify a type of event (e.g., pick of an item, return of an item, etc.), a user(s) involved in the event, an item involved in the event, and the like. Envision that a weight sensor on a particular aisle of the facility indicates that a particular item was removed from a shelf. In response to receiving this sensor data, the inventory management may determine which users were in the vicinity of this aisle at the time associated with the sensor data. Each of the users within a threshold proximity to the aisle at a time associated with the event may initially be indicated as candidate users for the event—that is, as users that potentially may have picked the item from the inventory location. If one of these users exits the store while the user remains a candidate user, then the inventory management system may await resolution of the event or removal of the user from the list of candidate users before finalizing the transaction with the exiting user. Thereafter, if the user that exited the facility is determined to have removed the item, then the virtual shopping cart of that user may be updated and, if no other holdups exist, the transaction with the user may be finalized. In another example, the inventory management system may determine that another user is the user that picked the item from the shelf and, thus, the exiting user may be removed as a candidate user and the transaction with the exiting user may be finalized.

In still another example, the inventory management system may refrain from finalizing a transaction with a user that exits the facility if the user is associated with a low-confidence event or result. As described above, if a user is associated with a low-confidence result, then the event (or a new event) may be reanalyzed by one or more human users. For example, inquiry data (e.g., certain sensor data) may be sent for analysis by the human user(s), who may determine the result of the event with high-confidence (e.g., with confidence greater than a threshold). Thereafter, the indication that the user is associated with a low-confidence result/event may be removed and the transaction with the user may finalized.

An example facility is described with reference to FIGS. 7-9. The facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of materials (inventory) handling. In other implementations, the techniques described herein may be implemented in other facilities or situations.

Figure 1B:
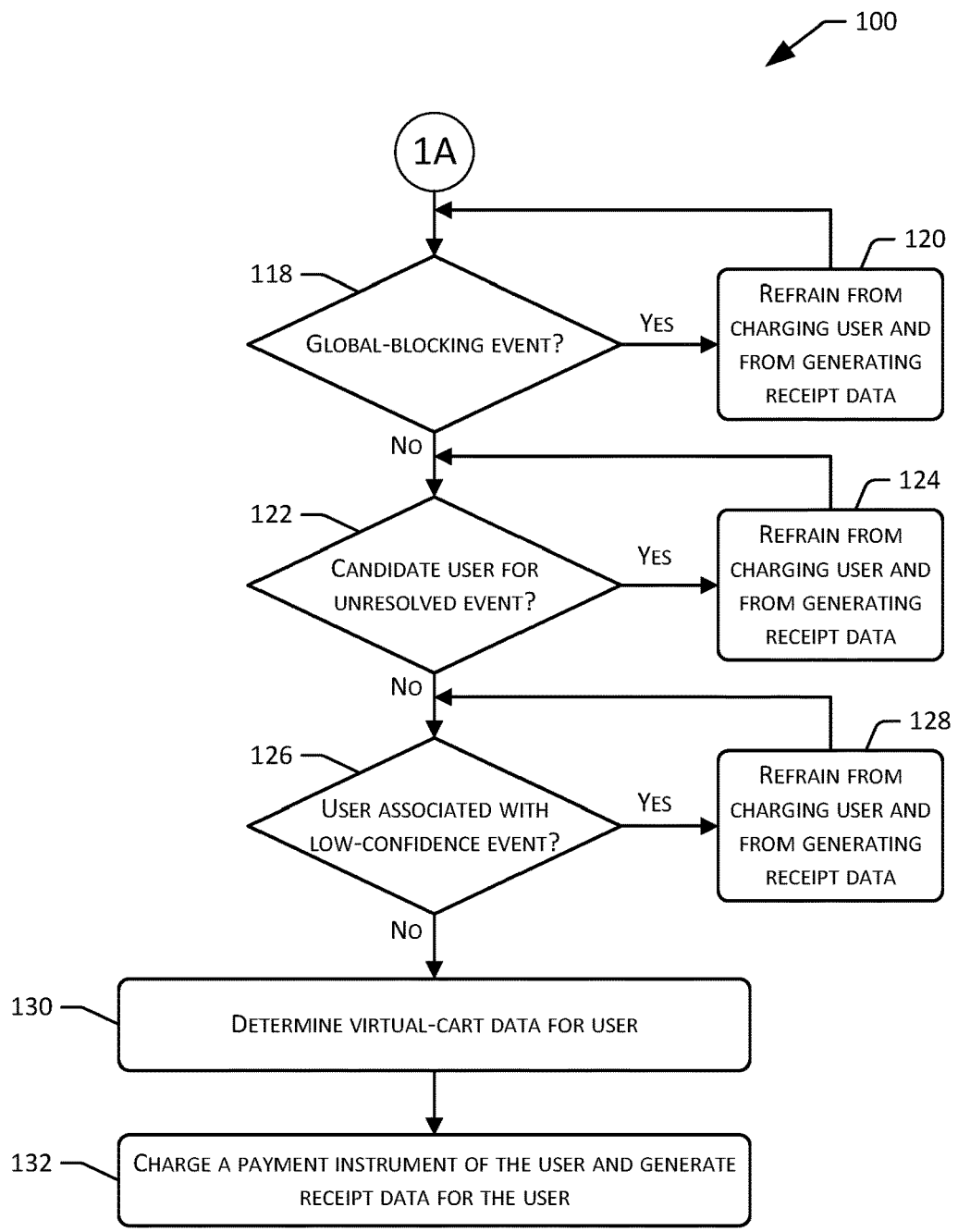

FIGS. 1A-B illustrates a flow diagram of an example process 100 for determining whether a transaction may be finalized with a user who has exited a facility, or whether or one or more events are to be finalized prior to finalizing the transaction with the user. In some instances, the process 100 may be performed in whole or in part by an inventory management system that receives sensor data from sensors within a facility and analyzes that sensor data to identify events, maintain virtual-cart states, checkout users, and the like. One implementation of an inventory management system is described in further detail below with FIGS. 7-9.

At an operation 102, the inventory management system receives first sensor data indicative of a user entering a facility. As noted above and described in further detail below, the sensor data may be captured by a camera, a weight sensor, a microphone, and/or any other type of sensor. For example, the user may scan an image presented on the user's mobile device at a scanning device of an entry/exit kiosk. The scanning device may read the image that uniquely identifies the user and may send information indicative of this image to the inventory management system, which may use the information to identify a profile of the user. The profile may indicate a shopping history with the user, one or more payment instruments that the user has associated with his or her account, and/or the like. In other instances, meanwhile, the first sensor data may comprise image or voice data.

Regardless of the type of data received at 102, at an operation 104 the inventory management system may analyze the sensor data to identify the user. Again, this may involve mapping the image from the user's mobile device, such as a barcode, to the profile of the user, using facial- or voice-recognition techniques to identify the user and his or her profile, or the like.

After identifying the user, at an operation 106 the inventory management system may locate the user through the facility, such that the user may be associated with events within the facility that he or she participates in. That is, the inventory management system may continue to receive sensor data associated with the user, such as image data and the like, for use in identifying events involving the user, such as the user picking an item from a shelf, returning an item to a shelf, giving or receiving an item from another user or the like. If these events involve the take or return of an item, the inventory management system may update the state of virtual-cart data associated with the user so as to maintain an accurate list of items that the user intends to acquire (e.g., purchase). Of course, while the example process 100 describes that the inventory management system first identifies the user prior to locating the user through the facility, in some instances the inventory management may begin locating the user without identifying the user or, in some instances, may locate the user through the facility without identifying the user.

At an operation 108, the inventory management system receives second sensor data indicative of the user removing an item from a first inventory location within the facility, such as a particular shelf in a particular aisle of the facility. While this example describes a "pick event", it is to be understood that this sensor data or other sensor data acquired by the sensors within the facility may be indicative of any other type of event. The second sensor data, meanwhile, may correspond to image data acquired by one or more overhead cameras, image data acquired by one or more cameras within the shelf or other inventory location, weight sensor data indicating a change in weight on the shelf or other inventory location, and/or any other type of sensor data.

At an operation 110, the inventory management system analyzes the second sensor data to identify the user removing the item from the first inventory location. For instances, the inventory management system may utilize trained classifiers, computer-vision, human-user analysis, and/or the like to identify the particular type of event indicated by the sensor data, the particular user that picked the item, the identity of the item picked, the time of the event, the location of the event, the start and end times of the event, other nearby users, and/or the like. Analysis of sensor data for identifying this type of information is described in further detail below with reference to FIGS. 7-9.

After identifying the user removing the item, at an operation 112 the inventory management system updates virtual-cart data associated with the user to indicate the addition of an item identifier associated with the picked item. For example, if the user picked a bottle of ketchup, the inventory management system may add an identifier of this item, along with a quantity of the item, a price of the item, and the like to the virtual-cart data associated with the user. The user may continue to navigate through the facility, removing items and adding them to their physical shopping carts (or "totes"), replacing items to shelves, and the like, during which time the inventory management system may continue to update the virtual-cart data of the user, as well as the virtual-cart data of other users in the facility.

At an operation 114, in this example the inventory management system receives third sensor data indicative of the user exiting the facility. Again, this sensor data may be received from an entry/exit kiosk and may represent image data of an image scanned by the user on the way out of the facility. In another example, the sensor data may comprise image data captured by a camera, voice data captured by a microphone, or the like. At an operation 116, the inventory management system analyzes the third sensor data to identify the user that exited the facility. At this point, the inventory management system may generate a session identifier associated with the shopping session of the user and may attempt to determine whether the session is able to be closed out or whether one or more events may be need to be finalized prior to finalizing a transaction with the user, as described below with reference to FIG. 1B.

FIG. 1B continues the illustration of the process 100 and includes, at an operation 118, the inventory management system determining whether a global-blocking event exists that would preclude finalizing the transaction with the user that exited the facility. A global-blocking event may represent an event that prevents finalizing transactions with any users that exit the facility until the global-blocking event is resolved. For example, the inventory management system may store an indication of a global-blocking event in instances where one or more sensors within the facility gone down, ceased functioning properly, or otherwise ceased sending sensor data.

If a global-blocking event is in place at the time of the exit of the user, then at an operation 120 the inventory management system refrains from finalizing a transaction with the user. For instance, the inventory management system may refrain from charging a payment instrument of the user for a cost of the items acquired by the user and refrains from generating receipt data indicating the acquisition and payment of these items. Instead, the process 100 returns to the operation 118 until the global-blocking event has been resolved or removed.

At an operation 122, the inventory management system may determine whether the user that exited the facility is a candidate user for one or more unresolved events that occurred within the facility. For example, when the inventory management system analyzes sensor data indicative of events within the system, the inventory management system may initially determine multiple candidate users that may be associated with or responsible for a particular event. For example, if three users are near a particular shelf at a time when an item is picked from the shelf, then the inventory management system may determine, based on known location coordinates of the three users at the time of the pick, that each of the three users is a candidate user for the event. That is, the inventory management system may determine that each of the three users may ultimately be associated with the event, such that the virtual-cart data of that user may be updated to indicate addition of an item identifier corresponding to the item. If the user that exited the facility remains a candidate user for an unresolved event, meanwhile, then it is possible that the virtual-cart data of the user may change (e.g., an item identifier may or removed). Therefore, if the user remains a candidate user for an unresolved event at a time of the user's exit from the facility, then at an operation 124 the inventory management system may refrain from finalizing a transaction with the user. That is, the inventory management system may refrain from charging a payment instrument of the user for a cost of the items acquired by the user and may refrain from generating receipt data indicating the acquisition and payment of these items. Instead, the process 100 returns to the operation 122 until the user is no longer a candidate user for any unresolved events.

At an operation 126, the inventory management system determines whether the user that exited the facility is associated with a low-confidence event. As described in further detail with reference to FIGS. 7-9, analysis of sensor data may produce a result of an event and a confidence level or score associated with that event. In some instances, if a confidence level is less than a threshold (e.g., is a low-confidence result), then the inventory management system may reanalyze the event (or a new event based on the same sensor data). Because of this reanalysis, the result of the event may change and, thus, at an operation 128 the inventory management system may refrain from finalizing a transaction with the user until the user is no longer associated with a low-confidence event. In some instances, as described below, sensor data associated with low-confidence events may be provided as inquiry data to human users, who may use computer-input tools to indicate the result(s) of the event. In some instances, this may replace the result of the low-confidence event, while in other instances a new event with this human-determined result may be created and associated with a high-confidence result, while the initial low-confidence event is removed or deleted.

If no global-blocking events exist, if the user is not a candidate user for an unresolved event, and if the user is not associated with a low-confidence event, then the inventory management system may finalize a transaction with the user that exited the facility. At an operation 130, the inventory management system determines virtual-cart data for the user at the time of exit. This may include identifying the items that the user picked, the cost of the items, and the like. At an operation 132, the inventory management system may identify a payment instrument previously associated with the profile of the user and may charge the payment instrument for a cost of the items acquired by the user (along with taxes and the like). In addition, the inventory management system may generate receipt data and may send this receipt data to a device previously associated with the profile of the user. The receipt data may indicate the items acquired by the user, the cost of the items, and/or the like.

In some instances, the operation 130 of determining virtual-cart data for the user at the time of exit may occur after determining that no events exist that preclude finalizing of a transaction with the user. In other instances, however, this data may be determined in whole in part prior to determining that no events exist that would preclude finalizing such a transaction. In these instances, the inventory management system may validate the determined contents of the virtual cart of determining that no events exists that would preclude finalization of a transaction with the user. That is, generating receipt data may occur after ensuring that no events exist that would preclude finalizing a transaction with the user, or this data may be generated prior to making this determination and validated (and/or updated) after making the determination that no events exist that would preclude finalizing a transaction with the user.

Figure 2:
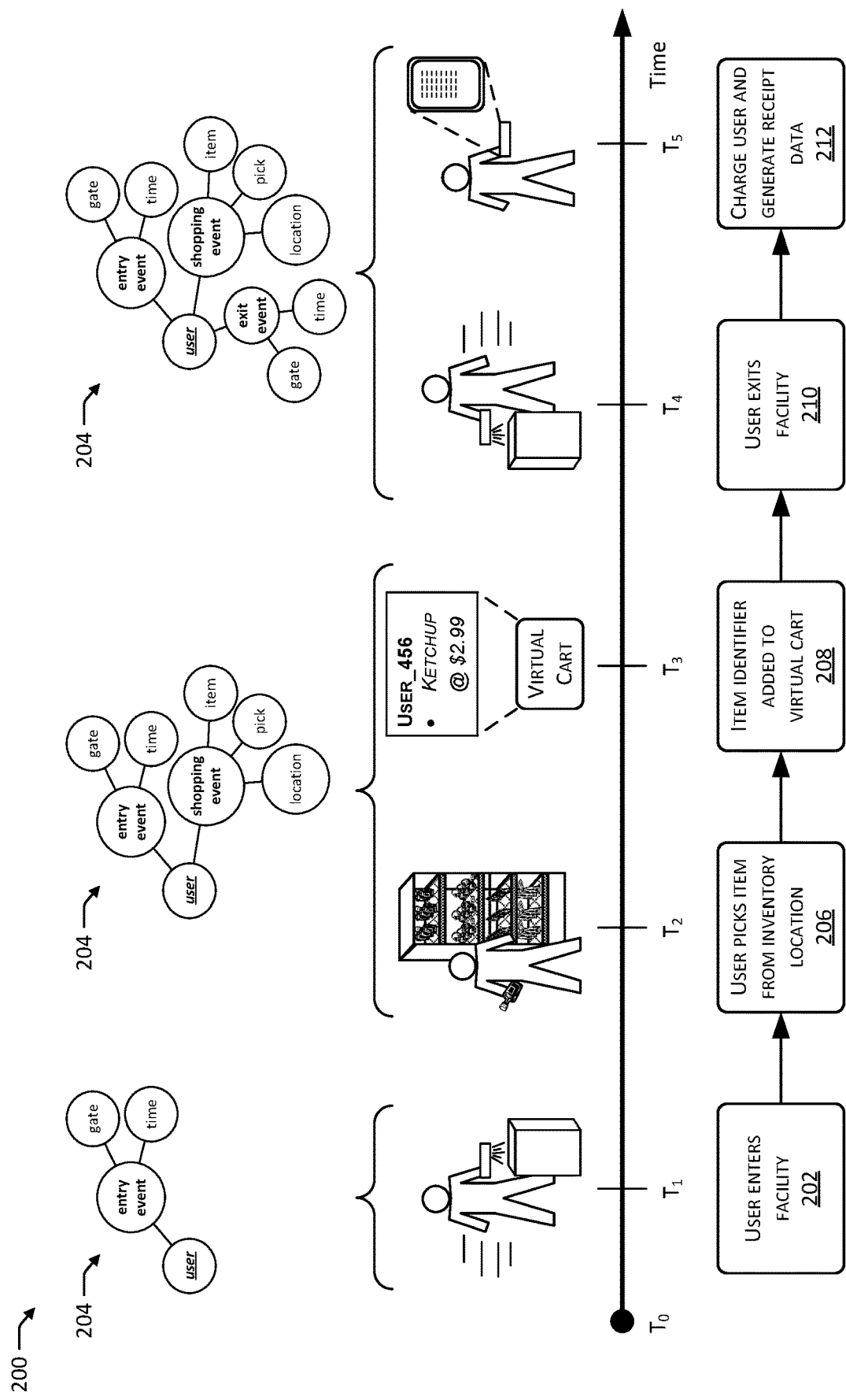
FIG. 2 illustrates a schematic diagram of finalizing a transaction with a user upon the user exiting the facility, given that no events are still to be processed prior to finalizing the transaction.

FIG. 2 illustrates a schematic diagram 200 of finalizing a transaction with a user upon the user exiting the facility, given that no events are still to be processed prior to finalizing the transaction. That is, FIG. 2 illustrates an example where the inventory management system is able to check out a user upon the user exiting the facility, given that the no global-blocking event is in place, the user is not a candidate user for an unresolved event, and the user is not associated with any low-confidence events. Further, FIG. 2 illustrates an example of how the inventory management system may build and store a graph for a user showing events associated with the user during a session of the user in the facility. For instance, the graph may indicate events, such as an entry event, shopping events, an exit event, and the like, each of which may include one or more edges to attributes or nodes associated with the respective event. As discussed below, the inventory management system may analyze the graph of the user's session upon the user exiting the facility to determine whether the each of the events are associated with high-confidence results for determining, in part, whether the inventory management system can check out the user. While not illustrated in FIGS. 3A-5B, it is to be appreciated that such a graph may be built and stored each time a user enters the facility.

At 202, the user enters the facility. As described above, the inventory management system may identify this entry and may identify the user based on the user scanning an image at an entry/exit kiosk, based on sensor data acquired by a camera and/or microphone, and/or the like. As illustrated, the inventory management system may create a graph 204, which initially includes a node associated with the identified user and a node indicating the entry event of the user entering the facility. The entry event may include an edge to an identifier of a gate at which the user entered the facility and an edge to an indication of the time of the user's entry. In some instances, the entry event may be associated with a confidence level. If greater than a threshold, this confidence level may be deemed high confidence, and if lower may be deemed low confidence.

At 206, the user picks an item from an inventory location within the facility. The inventory management system may analyze sensor data corresponding to this pick to identify the user associated with the event, the item, the start and/or end time of the event, and/or the like. At 208, the inventory management system adds an item identifier associated with the picked item to virtual-cart data of the user, reflecting that the user now has this item in his or her possession. Further, in this example the inventory management system analyzed the sensor data and determined the result of the event with high confidence (e.g., a confidence level greater than a preset threshold confidence level). As illustrated, the graph 204 has been updated to include a node indicating the shopping event that has been associated with the user. For instance, the shopping-event node includes an edge to an identifier of the subject item, an edge to the action identified (in this case a pick), and an edge to a location of the event, such as a particular aisle, shelf, and/or the like. In addition, and as noted above, this event may be associated with a confidence level, which in this example comprise a confidence level that is greater than a threshold.

At 210, the user exits the facility, at which point the inventory management system may analyze some or all of the sensor data described above to identify the exit by the user. Finally, at 212, the inventory management system determines that a transaction with the user may be finalized and, thus, the inventory management system charges a payment instrument of the user for the items the user acquired and generates receipt data for the user. In some instances, the inventory management system may send the receipt data to a device of the user.

As illustrated, when the user exits the facility, the graph 204 may be updated to indicate the addition of the exit-event node, which may include an edge to an identifier of a gate through which the user exited and an edge to an indication of a time at which the user exited. As with other nodes in the graph, this corresponding event may be associated with a confidence level. Further, upon adding the exit-event node to the graph 204, the inventory management system may analyze the graph to determine whether the system can check out the user. To do so, the inventory management system determines whether each event is associated with a high-confidence result. Further, in some instances, when the inventory management system identifies a global-blocking event, it may add a global-blocking event node to each user that that is in the facility. Thus, upon exit of the illustrated user, the inventory management system may determine whether a global-blocking event is associated with the graph 204 of the user. Given that there is no such global-blocking event, and given that the graph 204 indicates that each event associated with the user is associated with a high-confidence result (and, thus, the user is not associated with a low-confidence result and is not a candidate user for another unresolved event), the inventory management may finalize the transaction with the user. For example, the system may charge the payment instrument of the user and generate the receipt data associated with the transaction.

Figure 3A:
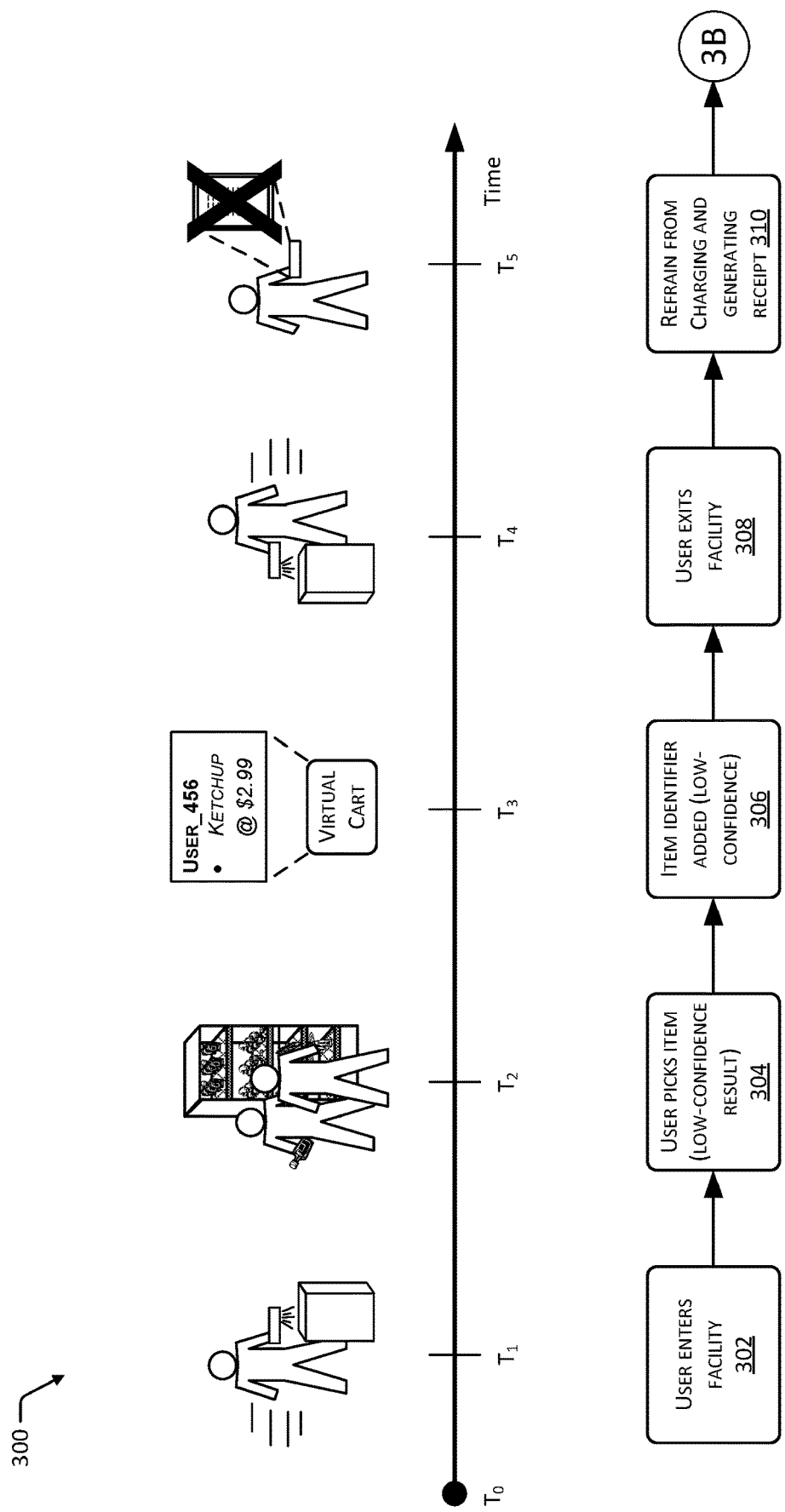
FIGS. 3A-B collectively illustrate a schematic diagram where a transaction with a user is not finalized upon the user exiting the facility given that the user is associated with a low-confidence result at the time of exit. The transaction is later finalized after the user is no longer associated with a low-confidence result.
Figure 3B:
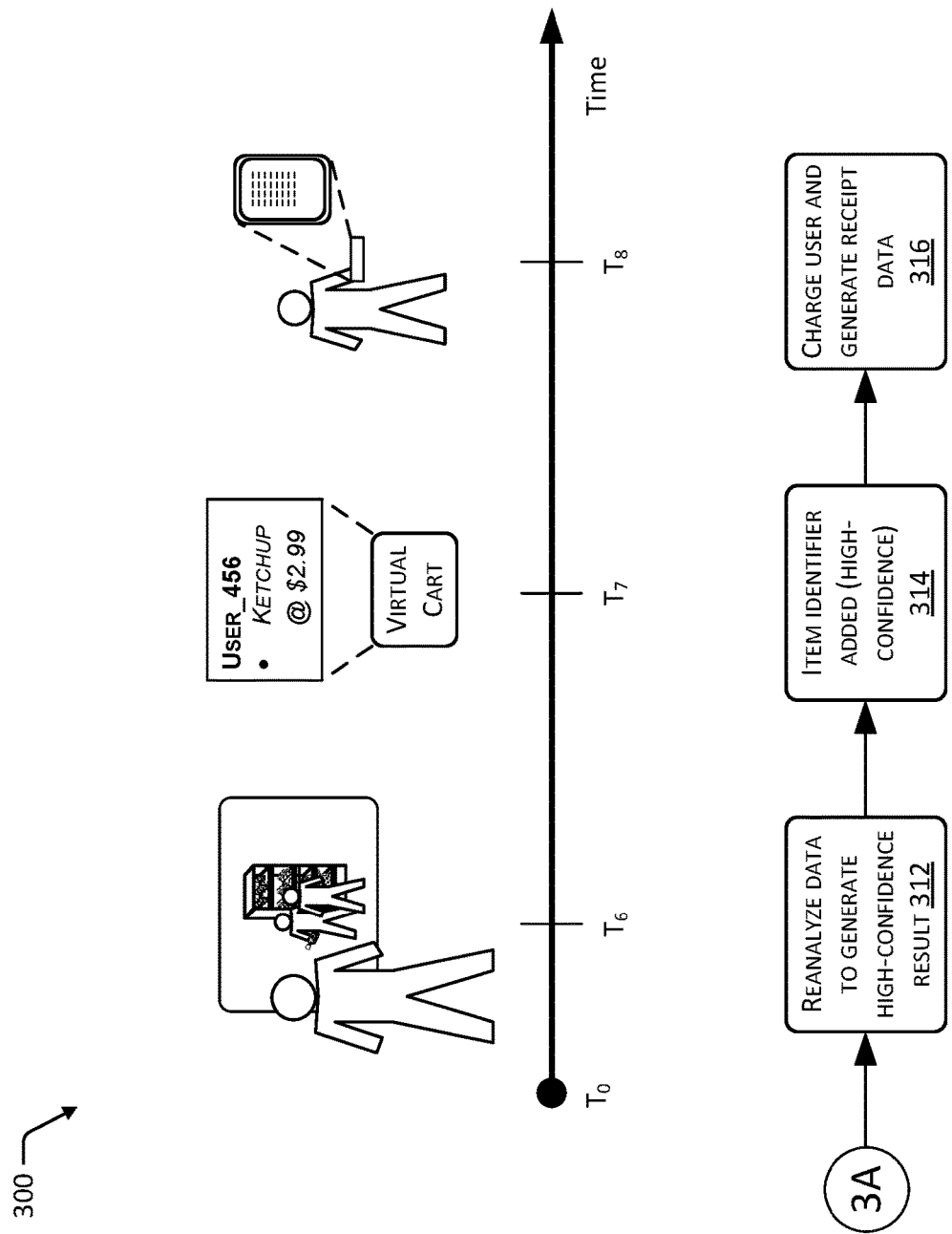

FIGS. 3A-B collectively illustrate a schematic diagram 300 where a transaction with a user is not finalized upon the user exiting the facility given that the user is associated with a low-confidence result at the time of exit. The transaction is later finalized after the user is no longer associated with a low-confidence result.

At 302, the user enters the facility. Again, the inventory management system may identify this entry and may identify the user based on the user scanning an image at an entry/exit kiosk, based on sensor data acquired by a camera and/or microphone, and/or the like. At 304, the user picks an item from an inventory location within the facility. The inventory management system may analyze sensor data corresponding to this pick to identify the user associated with the event, the item, the start and/or end time of the event, and/or the like. In this instance, however, the inventory management system analyzed the sensor data and determined the result of the event with low confidence (e.g., a confidence level lower than a preset threshold confidence level). Therefore, while at 306 the inventory management system may add an item identifier associated with the picked item to virtual-cart data of the user, reflecting that the user now has this item in his or her possession, the inventory management system may indicate that this result has a low confidence. In addition or in the alternative to adding the item identifier to the virtual-cart data, the inventory management system may trigger a reanalysis of the sensor data, such as by requesting that a human user analyze data associated with the event.

At 308, the user exits the facility, at which point the inventory management system may analyze some or all of the sensor data described above to identify the exit by the user. At 310, however, the inventory management system determines that a transaction with the user may not be finalized, given that the user is still associated with a low-confidence event, the results of which may change based on the reanalysis of the corresponding sensor data. Therefore, the inventory management system refrains from charging a payment instrument of the user and refrains from generating receipt data for the user.

FIG. 3B continues the illustration of the schematic diagram and includes, at 312, the inventory management system and/or human users reanalyzing the sensor data to generate high-confidence result associated with the event. The result may indicate that the user or another user picked the item (or performed another action on the same or a different item). In this example, it is determined that the user picked the initially identified item and, thus, the item identifier corresponding to the item is added to the virtual-cart data of the user with high confidence. Given that the user is no longer associated with the low-confidence event/result, at 316 the inventory management system finalizes the transaction with the user by charging a payment instrument of the user for the items the user acquired and generating receipt data for the user. In some instances, the inventory management system may send the receipt data to a device of the user.

Figure 4A:
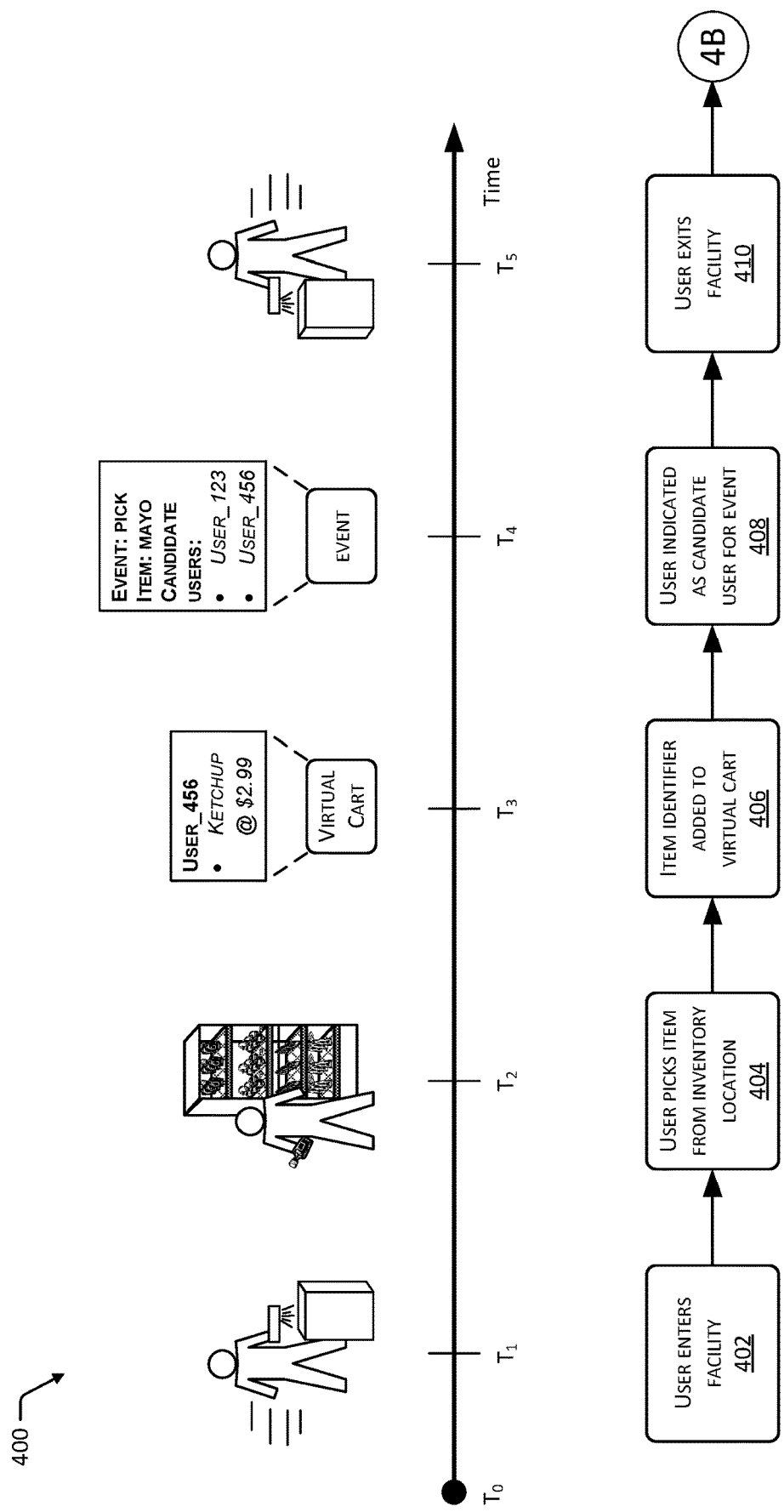
FIGS. 4A-B collectively illustrate a schematic diagram where a transaction with a user is not finalized upon the user exiting the facility given that the user is a candidate user for an unresolved event at the time of exit. The transaction is later finalized after the user is no longer a candidate user for the event, regardless of whether or not the user was associated with the event or simply removed as a candidate.
Figure 4B:
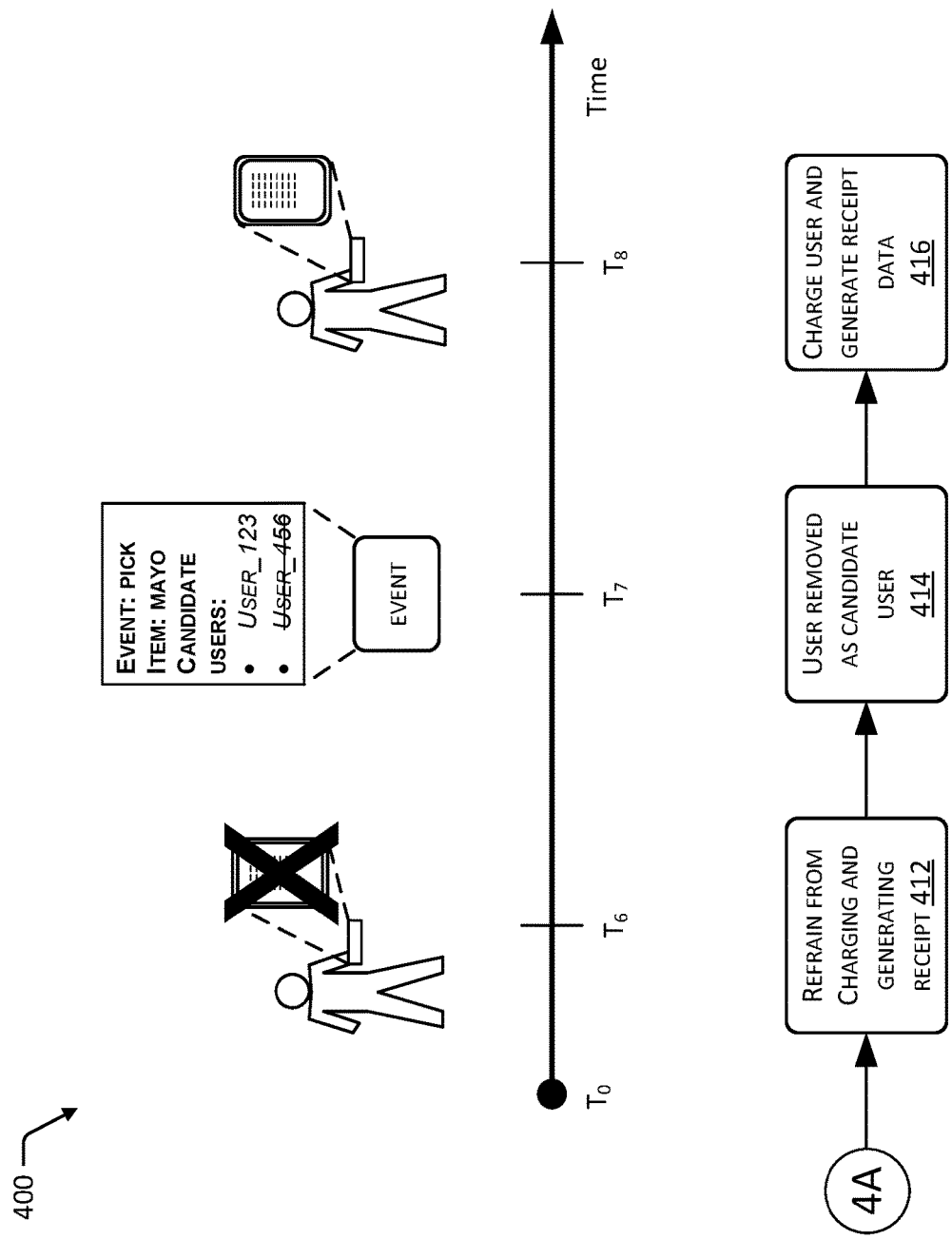

FIGS. 4A-B collectively illustrate a schematic diagram 400 where a transaction with a user is not finalized upon the user exiting the facility given that the user is a candidate user for an unresolved event at the time of exit. The transaction is later finalized after the user is no longer a candidate user for the event, regardless of whether or not the user was associated with the event or simply removed as a candidate.

At 402, the user enters the facility. Again, the inventory management system may identify this entry and may identify the user based on the user scanning an image at an entry/exit kiosk, based on sensor data acquired by a camera and/or microphone, and/or the like. At 404, the user picks an item from an inventory location within the facility. The inventory management system may analyze sensor data corresponding to this pick to identify the user associated with the event, the item, the start and/or end time of the event, and/or the like. At 406 the inventory management system adds an item identifier associated with the picked item to virtual-cart data of the user, reflecting that the user now has this item in his or her possession. In this example, the inventory management system identified the result with high confidence.

At 408, however, the user is identified as a candidate user for another event with the system. That is, in this example the inventory management has identified the user ("User_456") and another user ("User_123") as candidate users for picking an example item, a bottle of mayonnaise. At 410, the user exits the facility, at which point the inventory management system may analyze some or all of the sensor data described above to identify the exit by the user.

FIG. 4B continues the illustration and indicates, at 412, that the inventory management system determines that a transaction with the user may not be finalized, given that the user is still a candidate user for an unresolved event at the time of the user's exit. Therefore, the inventory management system refrains from charging a payment instrument of the user and refrains from generating receipt data for the user. At 414, the inventory management system removes the user that exited the facility ("User_456") as a candidate user based on further analysis of sensor data associated with the event. Given that the user is no longer a candidate user for an unresolved event, at 416 the inventory management system finalizes the transaction with the user by charging a payment instrument of the user for the items the user acquired and generating receipt data for the user. In some instances, the inventory management system may send the receipt data to a device of the user.

Figure 5B:
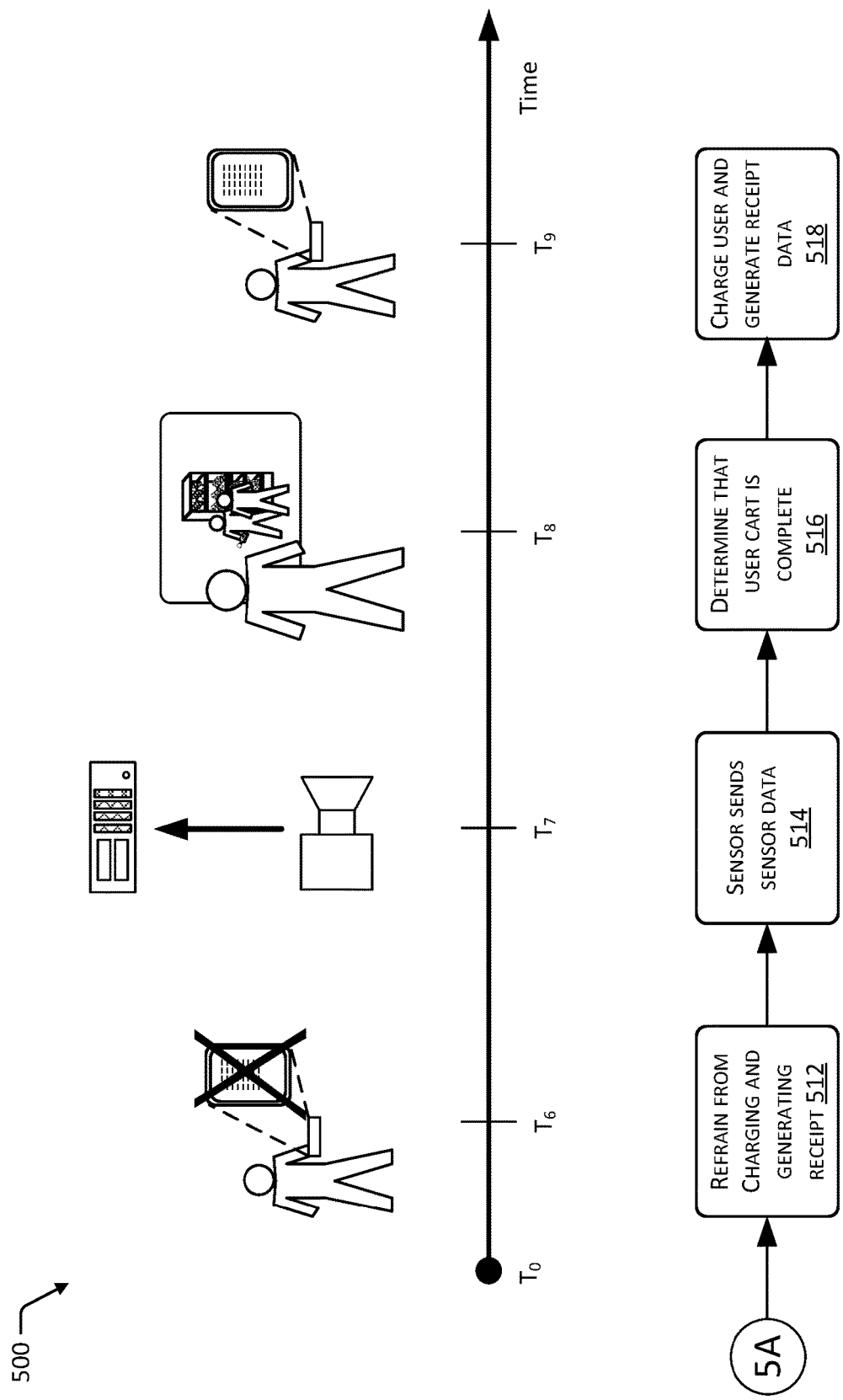

FIGS. 5A-B collectively illustrate a schematic diagram 500 where a transaction with a user is not finalized upon the user exiting the facility given that a global-blocking event is in place at a time of exit. Therefore, transactions with exiting users are not finalized at least until the global-blocking event is resolved, as in the illustrated example.

At 502, the user enters the facility. Again, the inventory management system may identify this entry and may identify the user based on the user scanning an image at an entry/exit kiosk, based on sensor data acquired by a camera and/or microphone, and/or the like. At 504, the user picks an item from an inventory location within the facility. The inventory management system may analyze sensor data corresponding to this pick to identify the user associated with the event, the item, the start and/or end time of the event, and/or the like. At 506 the inventory management system adds an item identifier associated with the picked item to virtual-cart data of the user, reflecting that the user now has this item in his or her possession. In this example, the inventory management system identified the result with high confidence.

At 508, however, a sensor with the facility ceases sending sensor data. In response to determining that the sensor has stopped successfully sending the sensor data to the inventory management system, the inventory management system stores an indication of a global-blocking event, precluding the finalizing of transactions with users exiting the facility between the time of the storing of the indication and removal of the indication. At 510, the user exits the facility, at which point the inventory management system may analyze some or all of the sensor data described above to identify the exit by the user.

FIG. 5B continues the illustration and indicates, at 512, that the inventory management system determines that a transaction with the user may not be finalized, given the current existence of the global-blocking event. Therefore, the inventory management system refrains from charging a payment instrument of the user and refrains from generating receipt data for the user. At 514, the sensor resumes sending the data, at which point the inventory management system analyzes the data to identify any events representative from the data and, after updating virtual-cart data of various users in the facility as necessary, removes the indication of the global-blocking event. At 516, the inventory management system, in this example, determines that the virtual-cart of the subject user is complete. That is, the sensor data is analyzed to determine whether to update any contents of the virtual cart of the user by, for example, adding or removing items from the virtual cart of the user based on analysis of the sensor data that has recently caught up to the current time. After the sensor data has been analyzed (and the virtual cart of the user is complete), the inventory management system may remove the indication of the global-blocking event. Given that the indication of the global-blocking event has been removed, at 518 the inventory management system finalizes the transaction with the user by charging a payment instrument of the user for the items the user acquired and generating receipt data for the user. In some instances, the inventory management system may send the receipt data to a device of the user.

Figure 6:
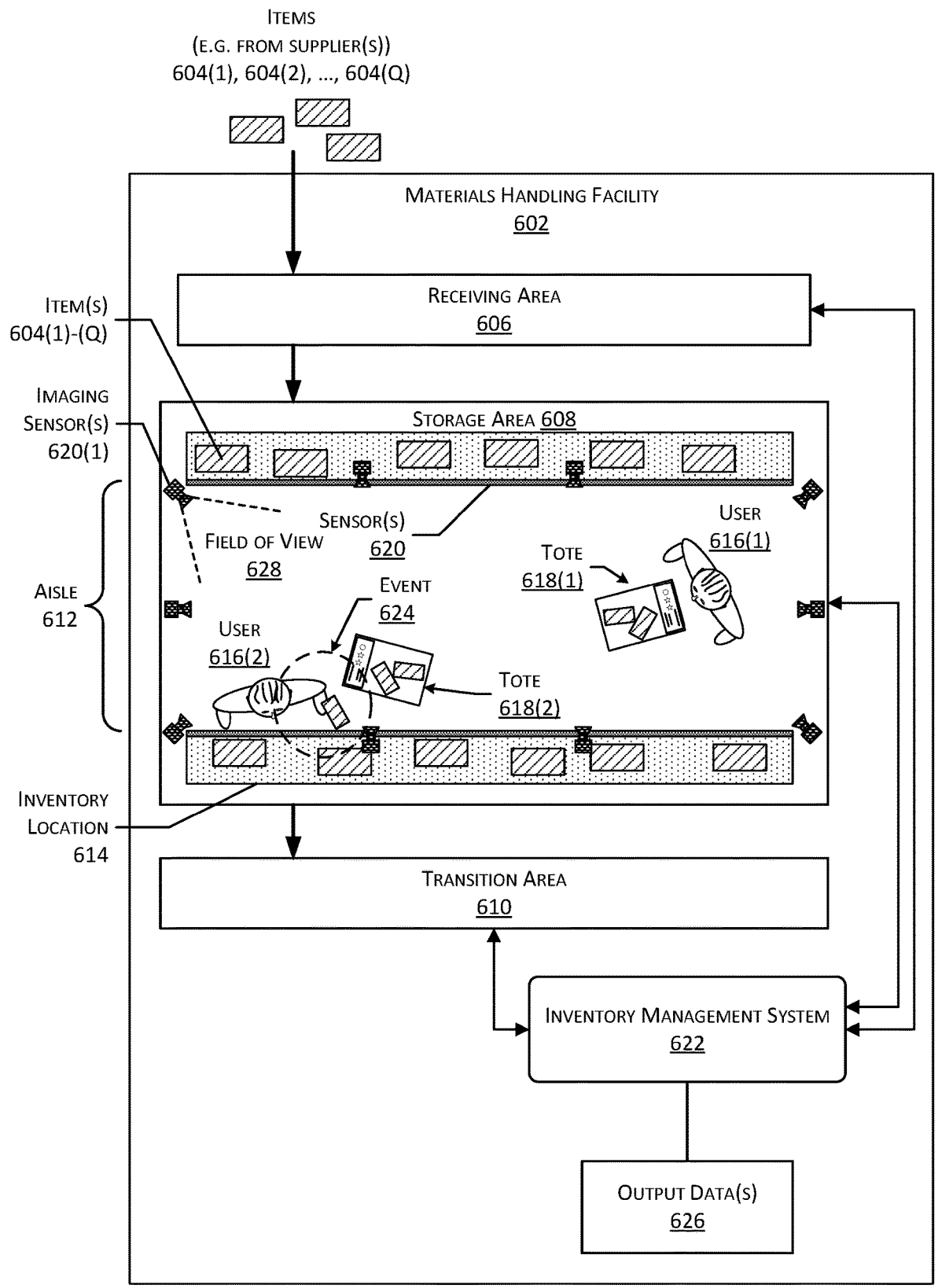
FIG. 6 is a block diagram of a materials handling facility that includes sensors and an inventory management system configured to generate output regarding events occurring in the facility using the sensor data. The events may include, for example, a user picking an item or returning an item. In some instances, the inventor management system maintains a state of virtual shopping cart of each user in the facility using the sensor data.

FIG. 6 illustrates an implementation of a materials handling system configured to store and manage inventory items and, thus, configured to utilize the techniques for maintaining accurate states of virtual carts and finalizing transactions with users at the appropriate times. A materials handling facility 602 (facility) comprises one or more physical structures or areas within which one or more items 604(1), 604(2), . . . , 604(Q) (generally denoted as 604) may be held. As used in this disclosure, letters in parenthesis such as "(Q)" indicate an integer result. The items 604 comprise physical goods, such as books, pharmaceuticals, repair parts, electronic gear, groceries, and so forth.

The facility 602 may include one or more areas designated for different functions with regard to inventory handling. In this illustration, the facility 602 includes a receiving area 606, a storage area 608, and a transition area 610. The receiving area 606 may be configured to accept items 604, such as from suppliers, for intake into the facility 602. For example, the receiving area 606 may include a loading dock at which trucks or other freight conveyances unload the items 604.

The storage area 608 is configured to store the items 604. The storage area 608 may be arranged in various physical configurations. In one implementation, the storage area 608 may include one or more aisles 612. The aisle 612 may be configured with, or defined by, inventory locations 614 on one or both sides of the aisle 612. The inventory locations 614 may include one or more of shelves, racks, cases, cabinets, bins, floor locations, or other suitable storage mechanisms for holding or storing the items 604. The inventory locations 614 may be affixed to the floor or another portion of the facility's structure, or may be movable such that the arrangements of aisles 612 may be reconfigurable. In some implementations, the inventory locations 614 may be configured to move independently of an outside operator. For example, the inventory locations 614 may comprise a rack with a power source and a motor, operable by a computing device to allow the rack to move from one location within the facility 602 to another.

One or more users 616(1), 616(2), . . . , 616(U) (generally denoted as 616), totes 618(1), 618(2), . . . , 618(T) (generally denoted as 618) or other material handling apparatus may move within the facility 602. For example, the users 616 may move about within the facility 602 to pick or place the items 604 in various inventory locations 614, placing them on the totes 618 for ease of transport. An individual tote 618 is configured to carry or otherwise transport one or more items 604. For example, a tote 618 may include a basket, a cart, a bag, and so forth. In other implementations, other agencies such as robots, forklifts, cranes, aerial drones, and so forth, may move about the facility 602 picking, placing, or otherwise moving the items 604.

One or more sensors 620 may be configured to acquire information in the facility 602. The sensors 620 may include, but are not limited to, cameras 620(1), weight sensors, radio frequency (RF) receivers, temperature sensors, humidity sensors, vibration sensors, and so forth. The sensors 620 may be stationary or mobile, relative to the facility 602. For example, the inventory locations 614 may contain cameras 620(1) configured to acquire images of pick or placement of items 604 on shelves, of the users 616(1) and 616(2) in the facility 602, and so forth. In another example, the floor of the facility 602 may include weight sensors configured to determine a weight of the users 616 or other object thereupon. The sensors 620 are discussed in more detail below with regard to FIG. 7.

During operation of the facility 602, the sensors 620 may be configured to provide information suitable for tracking how objects move or other occurrences within the facility 602. For example, a series of images acquired by a camera 620(1) may indicate removal of an item 604 from a particular inventory location 614 by one of the users 616 and placement of the item 604 on or at least partially within one of the totes 618.

While the storage area 608 is depicted as having one or more aisles 612, inventory locations 614 storing the items 604, sensors 620, and so forth, it is understood that the receiving area 606, the transition area 610, or other areas of the facility 602 may be similarly equipped. Furthermore, the arrangement of the various areas within the facility 602 is depicted functionally rather than schematically. For example, multiple different receiving areas 606, storage areas 608, and transition areas 610 may be interspersed rather than segregated in the facility 602.

The facility 602 may include, or be coupled to, an inventory management system 622. The inventory management system 622 is configured to identify interactions with and between users 616, devices such as sensors 620, robots, material handling equipment, computing devices, and so forth, in one or more of the receiving area 606, the storage area 608, or the transition area 610. These interactions may include one or more events 624. For example, events 624 may include the entry of the user 616 to the facility 602, stocking of items 604 at an inventory location 614, picking of an item 604 from an inventory location 614, returning of an item 604 to an inventory location 614, placement of an item 604 within a tote 618, movement of users 616 relative to one another, gestures by the users 616, and so forth. Other events 624 involving users 616 may include the user 616 providing authentication information in the facility 602, using a computing device at the facility 602 to authenticate identity to the inventory management system 622, and so forth. Some events 624 may involve one or more other objects within the facility 602. For example, the event 624 may comprise movement within the facility 602 of an inventory location 614, such as a counter mounted on wheels. Events 624 may involve one or more of the sensors 620. For example, a change in operation of a sensor 620, such as a sensor failure, change in alignment, and so forth, may be designated as an event 624. Continuing the example, movement of a camera 620(1) resulting in a change in the orientation of the field of view 628 (such as resulting from someone or something bumping the camera 620(1)) may be designated as an event 624.

By determining the occurrence of one or more of the events 624, the inventory management system 622 may generate output data 626. The output data 626 comprises information about the event 624. For example, where the event 624 comprises an item 604 being removed from an inventory location 614, the output data 626 may comprise an item identifier indicative of the particular item 604 that was removed from the inventory location 614 and a user identifier of a user that removed the item.

The inventory management system 622 may use one or more automated systems to generate the output data 626. For example, an artificial neural network, one or more classifiers, or other automated machine learning techniques may be used to process the sensor data from the one or more sensors 620 to generate output data 626. The automated systems may operate using probabilistic or non-probabilistic techniques. For example, the automated systems may use a Bayesian network. In another example, the automated systems may use support vector machines to generate the output data 626 or the tentative results. The automated systems may generate confidence level data that provides information indicative of the accuracy or confidence that the output data 626 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 95%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 604, user 616, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 616 may pick an item 604(1) such as a perfume bottle that is generally cubical in shape from the inventory location 614. Other items 604 at nearby inventory locations 614 may be predominately spherical. Based on the difference in shape (cube vs. sphere) from the adjacent items, and the correspondence in shape with the previously stored image of the perfume bottle item 604(1) (cubical and cubical), the confidence level that the user 616 has picked up the perfume bottle item 604(1) is high.

In some situations, the automated techniques may be unable to generate output data 626 with a confidence level above a threshold result. For example, the automated techniques may be unable to distinguish which user 616 in a crowd of users 616 has picked up the item 604 from the inventory location 614. In other situations, it may be desirable to provide human confirmation of the event 624 or of the accuracy of the output data 626. For example, some items 604 may be deemed age restricted such that they are to be handled only by users 616 above a minimum age threshold.

In instances where human confirmation is desired, sensor data associated with an event 624 may be processed to generate inquiry data. The inquiry data may include a subset of the sensor data associated with the event 624. The inquiry data may also include one or more of one or more tentative results as determined by the automated techniques, or supplemental data. The subset of the sensor data may be determined using information about the one or more sensors 620. For example, camera data such as the location of the camera 620(1) within the facility 602, the orientation of the camera 620(1), and a field of view 628 of the camera 620(1) may be used to determine if a particular location within the facility 602 is within the field of view 628. The subset of the sensor data may include images that may show the inventory location 614 or that the item 604 was stowed. The subset of the sensor data may also omit images from other cameras 620(1) that did not have that inventory location 614 in the field of view 628. The field of view 628 may comprise a portion of the scene in the facility 602 that the sensor 620 is able to generate sensor data about.

Continuing the example, the subset of the sensor data may comprise a video clip acquired by one or more cameras 620(1) having a field of view 628 that includes the item 604. The tentative results may comprise the "best guess" as to which items 604 may have been involved in the event 624. For example, the tentative results may comprise results determined by the automated system that have a confidence level above a minimum threshold.

Furthermore, and as noted above, when a result of an event record is determined to be below a threshold confidence result, prior to sending the sensor data associated with the event 624 to the human associate, the inventor management system 622 may determine whether the record of the event 624 is to be merged with any other event records. If so, the inventor management system 622 may store an indication of the merged event and may send the user interface comprising inquiry data (e.g., a video clip, etc.) associated with the entire merged event to the computing device of the human associate.

In some instances, the user interface may also include supplemental data, such as the weight of the item 604, bounding boxes or other visual cues to overlay or that have been inserted into the video clip for presentation, and so forth. The inquiry data is provided to a device associated with an associate. For example, the device may comprise a tablet computer, laptop computer, personal computer, set-top box, and so forth. The device presents an associate user interface based at least in part on the inquiry data. Continuing the example, the associate user interface may present the video clip of the item 604 being removed from the inventory location 614. One or more of the tentative results associated with the identity of the item 604 may also be presented in the associate user interface. The associate may view the video clip and the supplemental data and make a selection from the tentative results to identify the item 604 was removed from the inventory location 614. The selection or other information generated by the associate comprises response data. The response data from one or more associates may be processed to generate the output data 626. For example, the majority of the associates may identify the item 604 that was picked from the inventory location 614 as "5 oz box powdered toast". Based at least in part on the majority selection, the inventory management system 622 may generate output data 626 indicating that the item 604 picked was "5 oz box powdered toast".

The facility 602 may be configured to receive different kinds of items 604 from various suppliers and to store them until a customer orders or retrieves one or more of the items 604. A general flow of items 604 through the facility 602 is indicated by the arrows of FIG. 6. Specifically, as illustrated in this example, items 604 may be received from one or more suppliers, such as manufacturers, distributors, wholesalers, and so forth, at the receiving area 606. In various implementations, the items 604 may include merchandise, commodities, perishables, or any suitable type of item 604, depending on the nature of the enterprise that operates the facility 602. The receiving of the items 604 may comprise one or more events 624 for which the inventory management system 622 may generate output data 626.

Upon being received from a supplier at receiving area 606, the items 604 may be prepared for storage. For example, items 604 may be unpacked or otherwise rearranged. The inventory management system 622 may include one or more software applications executing on a computer system to provide inventory management functions based on the events 624 associated with the unpacking or rearrangement. These inventory management functions may include maintaining information indicative of the type, quantity, condition, cost, location, weight, or any other suitable parameters with respect to the items 604. The items 604 may be stocked, managed, or dispensed in terms of countable, individual units or multiples, such as packages, cartons, crates, pallets, or other suitable aggregations. Alternatively, some items 604, such as bulk products, commodities, and so forth, may be stored in continuous or arbitrarily divisible amounts that may not be inherently organized into countable units. Such items 604 may be managed in terms of measurable quantity such as units of length, area, volume, weight, time, duration, or other dimensional properties characterized by units of measurement. Generally speaking, a quantity of an item 604 may refer to either a countable number of individual or aggregate units of an item 604 or a measurable amount of an item 604, as appropriate.

After arriving through the receiving area 606, items 604 may be stored within the storage area 608. In some implementations, like items 604 may be stored or displayed together in the inventory locations 614 such as in bins, on shelves, hanging from pegboards, and so forth. In this implementation, all items 604 of a given kind are stored in one inventory location 614. In other implementations, like items 604 may be stored in different inventory locations 614. For example, to optimize retrieval of certain items 604 having frequent turnover within a large physical facility 602, those items 604 may be stored in several different inventory locations 614 to reduce congestion that might occur at a single inventory location 614. Storage of the items 604 and their respective inventory locations 614 may comprise one or more events 624.

When a customer order specifying one or more items 604 is received, or as a user 616 progresses through the facility 602, the corresponding items 604 may be selected or "picked" from the inventory locations 614 containing those items 604. In various implementations, item picking may range from manual to completely automated picking. For example, in one implementation, a user 616 may have a list of items 604 they desire and may progress through the facility 602 picking items 604 from inventory locations 614 within the storage area 608, and placing those items 604 into a tote 618. In other implementations, employees of the facility 602 may pick items 604 using written or electronic pick lists derived from customer orders. These picked items 604 may be placed into the tote 618 as the employee progresses through the facility 602. Picking may comprise one or more events 624, such as the user 616 moving to the inventory location 614, retrieval of the item 604 from the inventory location 614, and so forth.

After items 604 have been picked, they may be processed at a transition area 610. The transition area 610 may be any designated area within the facility 602 where items 604 are transitioned from one location to another or from one entity to another. For example, the transition area 610 may be a packing station within the facility 602. When the item 604 arrives at the transition area 610, the items 604 may be transitioned from the storage area 608 to the packing station. The transitioning may comprise one or more events 624. Information about the transition may be maintained by the inventory management system 622 using the output data 626 associated with those events 624.

In another example, if the items 604 are departing the facility 602 a list of the items 604 may be obtained and used by the inventory management system 622 to transition responsibility for, or custody of, the items 604 from the facility 602 to another entity. For example, a carrier may accept the items 604 for transport with that carrier accepting responsibility for the items 604 indicated in the list. In another example, a customer may purchase or rent the items 604 and remove the items 604 from the facility 602. The purchase or rental may comprise one or more events 624.

During use of the facility 602, the user 616 may move about the facility 602 to perform various tasks, such as picking or placing the items 604 in the inventory locations 614. Pluralities of users 616 may move past one another, travel in groups, may coalesce into groups, groups may break apart, and so forth. These movements may comprise one or more events 624. For example, an event 624 may comprise a plurality of users 616 moving past one another in the aisle 612.

The inventory management system 622 may access or generate sensor data about the facility 602 and the contents therein including the items 604, the users 616, the totes 618, and so forth. The sensor data may be acquired by one or more of the sensors 620, data provided by other systems, and so forth. For example, the sensors 620 may include cameras 620(1) configured to acquire image data of scenes in the facility 602. The image data may comprise still images, video, or a combination thereof. The image data may be processed by the inventory management system 622 to determine a location of the user 616, the tote 618, the identity of the user 616, and so forth. As used herein, the identity of the user may represent a unique identifier of the user (e.g., name, number associated with user, username, etc.), an identifier that distinguishes the user amongst other users being located with the environment, or the like. The sensors 620 are discussed in more detail below with regard to FIG. 7.

The inventory management system 622, or systems coupled thereto, may be configured to identify the user 616, as well as to determine other candidate users. In one implementation, this determination may comprise comparing sensor data with previously stored identity data. For example, the user 616 may be identified by showing their face to a facial recognition system, by presenting a token carrying authentication credentials, providing a fingerprint, scanning a barcode or other type of unique identifier upon entering the facility, and so forth. Identity of the user 616 may be determined before, during, or after entry to the facility 602. Determination of the user's 116 identity may comprise comparing sensor data associated with the user 616 in the facility 602 to previously stored user data.

In some instances, the inventory management system group users within the facility into respective sessions. That is, the inventory management system 622 may utilize the sensor data to determine groups of users that are effectively "together" (e.g., shopping together). In some instances, a particular session may include multiple users that entered the facility 602 together and, potentially, that navigate the facility together. For example, when a family of two adults and two children enter the facility together, the inventory management system may associate each user with a particular locating session. Locating sessions in addition to individual users may help in determining the outcome of individual events, given that users within a session may not only individually pick or return or otherwise interact with items, but may also pass the items back and forth amongst each other. For instance, a child in the above example may pick the box of cereal before handing the box to her mother, who may place it in her tote 618. Noting the child and the mother as belonging to the same session may increase the chances of successfully adding the box of cereal to the virtual shopping cart of the mother.

By determining the occurrence of one or more events 624 and the output data 626 associated therewith, the inventory management system 622 is able to provide one or more services to the users 616 of the facility 602. By utilizing one or more human associates to process inquiry data and generate response data that may then be used to produce output data 626, overall accuracy of the system may be enhanced. The enhanced accuracy may improve the user experience of the one or more users 616 of the facility 602.

Figure 7:
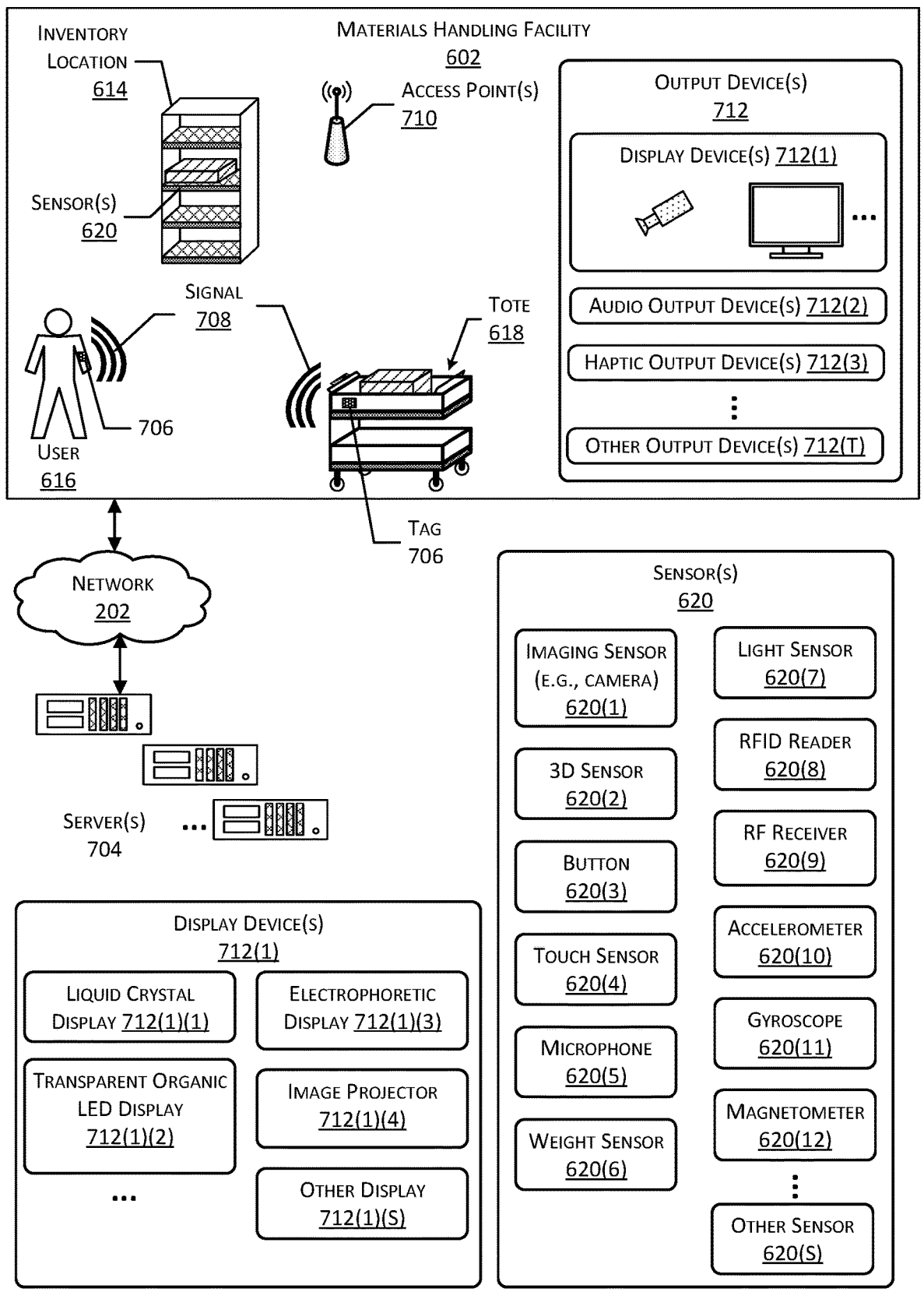
FIG. 7 is a block diagram illustrating additional details of the facility, including example sensors that may facilitate maintaining accurate states of virtual shopping carts of users within the facility.

FIG. 7 is a block diagram illustrating additional details of the facility 602, according to some implementations. The facility 602 may be connected to one or more networks 702, which in turn connect to one or more servers 704. The network 702 may include private networks such as an institutional or personal intranet, public networks such as the Internet, or a combination thereof. The network 702 may utilize wired technologies (e.g., wires, fiber optic cable, and so forth), wireless technologies (e.g., radio frequency, infrared, acoustic, optical, and so forth), or other connection technologies. The network 702 is representative of any type of communication network, including one or more of data networks or voice networks. The network 702 may be implemented using wired infrastructure (e.g., copper cable, fiber optic cable, and so forth), a wireless infrastructure (e.g., cellular, microwave, satellite), or other connection technologies.

The servers 704 may be configured to execute one or more modules or software applications associated with the inventory management system 622. While the servers 704 are illustrated as being in a location outside of the facility 602, in other implementations, at least a portion of the servers 704 may be located at the facility 602. The servers 704 are discussed in more detail below with regard to FIG. 8.

The users 616, the totes 618, or other objects in the facility 602 may be equipped with one or more tags 706, such as radio frequency (RF) tags. The tags 706 may be configured to emit a signal 708. In one implementation, the tag 706 may be a radio frequency identification (RFID) tag configured to emit a RF signal 708 upon activation by an external signal. For example, the external signal may comprise a radio frequency signal or a magnetic field configured to energize or activate the RFID tag 706. In another implementation, the tag 706 may comprise a transmitter and a power source configured to power the transmitter. For example, the tag 706 may comprise a Bluetooth Low Energy (BLE) transmitter and battery. In other implementations, the tag 706 may use other techniques to indicate presence. For example, an acoustic tag 706 may be configured to generate an ultrasonic signal which is detected by corresponding acoustic receivers. In yet another implementation, the tag 706 may be configured to emit an optical signal.

The inventory management system 622 may be configured to use the tags 706 for one or more of identification of the object, determining a location of the object, and so forth. For example, the users 616 may wear tags 706, the totes 618 may have tags 706 affixed, and so forth, which may be read and, based at least in part on signal strength, used to determine identity and location. Generally, the inventory management system 622 or other systems associated with the facility 602 may include any number and combination of input components, output components, and servers 704.

The one or more sensors 620 may be arranged at one or more locations within the facility 602. For example, the sensors 620 may be mounted on or within a floor, wall, at a ceiling, at an inventory location 614, on the tote 618, may be carried or worn by the user 616, and so forth. The sensors 620 produce respective sensor data.

The sensors 620 may include one or more cameras 620(1). These cameras 620(1) may include cameras configured to acquire images of a scene. The cameras 620(1) are configured to detect light in one or more wavelengths including, but not limited to, terahertz, infrared, visible, ultraviolet, and so forth. The cameras 620(1), as well as any image sensors described herein, may provide sensor data in the form of the image data, in the form of indications of what item was picked or return and the location of the item, combinations thereof, and/or the like. The inventory management system 622 may use image data acquired by the cameras 620(1) during operation of the facility 602. For example, the inventory management system 622 may identify items 604, identify users 616, identify totes 618, determine a location, and so forth, based at least in part on their appearance within the image data.

One or more three-dimensional (3D) sensors 620(2) may also be included in the sensors 620. The 3D sensors 620(2) are configured to acquire spatial or 3D data, such as depth information, about objects within a sensor field-of-view. The 3D sensors 620(2) include range cameras, lidar systems, sonar systems, radar systems, structured light systems, stereo vision systems, optical interferometry systems, and so forth. The inventory management system 622 may use the 3D data acquired to identify objects, determine a location of an object, and so forth. For example, the inventory management system 622 may determine operational data such as location in the facility 602 of the user 616 based at least in part on the location in 3D space of the user 616.

One or more buttons 620(3) are configured to accept input from the user 616. The buttons 620(3) may comprise mechanical, capacitive, optical, or other mechanisms. For example, the buttons 620(3) may comprise mechanical switches configured to accept an applied force from a touch of the user 616 to generate an input signal. The inventory management system 622 may use data from the buttons 620(3) to receive information from the user 616 and produce button data.

The sensors 620 may include one or more touch sensors 620(4). The touch sensors 620(4) may use resistive, capacitive, surface capacitance, projected capacitance, mutual capacitance, optical, Interpolating Force-Sensitive Resistance (IFSR), or other mechanisms to determine the position of a touch or near-touch and generate touch sensor data. For example, the IFSR may comprise a material configured to change electrical resistance responsive to an applied force. The position within the material of that change in electrical resistance may indicate the position of the touch. The inventory management system 622 may use data from the touch sensors 620(4) to receive information from the user 616. For example, the touch sensor 620(4) may be integrated with the tote 618 to provide a touchscreen with which the user 616 may select from a menu one or more particular items 604 for picking.

One or more microphones 620(5) may be configured to acquire information indicative of sound present in the environment and generate audio data. In some implementations, arrays of microphones 620(5) may be used. These arrays may implement beamforming techniques to provide for directionality of gain. The inventory management system 622 may use the one or more microphones 620(5) to acquire information from acoustic tags, accept voice input from the users 616, determine the location of one or more users 616 in the facility 602, determine ambient noise level, and so forth.

One or more weight sensors 620(6) are configured to measure the weight of a load, such as the item 604, the user 616, the tote 618, and so forth and generate weight data. The weight sensors 620(6) may be configured to measure the weight of the load at one or more of the inventory locations 614, the tote 618, or on the floor of the facility 602. The weight sensors 620(6) may include one or more sensing mechanisms to determine weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers, which generate one or more signals based on an applied force, such as that of the load due to gravity. The inventory management system 622 may use the data acquired by the weight sensors 620(6) to identify an object, determine a location of an object, maintain shipping records, identify the user 616, and so forth. In addition to the weight data, the weight sensors 620(6) may send an indication of an item picked or returned and a location of the item, an indication of a cost of an item removed, combinations there, and/or the like. Further, each of the sensors 620 may provide this type of data.

The sensors 620 may include one or more light sensors 620(7) configured to generate light sensor data. The light sensors 620(7) may be configured to provide information associated with ambient lighting conditions such as a level of illumination. Information acquired by the light sensors 620(7) may be used by the inventory management system 622 to adjust a level, intensity, or configuration of the user interface.

One more radio frequency identification (RFID) readers 620(8), near field communication (NFC) systems, and so forth, may also be provided in the sensors 620. For example, the RFID readers 620(8) may be configured to read the tags 706 and generate RFID tag data. Information acquired by the RFID reader 620(8) may be used by the inventory management system 622 to identify an object associated with the tag 706 such as the item 604, the user 616, the tote 618, and so forth. For example, based on information from the RFID readers 620(8), a velocity of the tag 706 may be determined.

One or more RF receivers 620(9) may also be provided in the sensors 620 to generate radio-frequency data. In some implementations, the RF receivers 620(9) may be part of transceiver assemblies. The RF receivers 620(9) may be configured to acquire RF signals 708 associated with Wi-Fi™, Bluetooth®, ZigBee®, Z-Wave, 3G, 4G, LTE, or other wireless data transmission technologies. The RF receivers 620(9) may provide information associated with data transmitted via radio frequencies, signal strength of RF signals 708, and so forth. For example, information from the RF receivers 620(9) may be used by the inventory management system 622 to determine a location of an RF source, such as a communication interface onboard the tote 618 or carried by the user 616.

The sensors 620 may include one or more accelerometers 620(10) that may be worn or carried by the user 616, mounted to the tote 618, and so forth. The accelerometers 620(10) may provide accelerometer data such as the direction and magnitude of an imposed acceleration. Data such as rate of acceleration, determination of changes in direction, speed, and so forth, may be determined using the accelerometers 620(10).

A gyroscope 620(11) provides gyroscope data indicative of rotation of an object affixed thereto. For example, the tote 618, the user 616, or other objects may be equipped with a gyroscope 620(11) to provide data indicative of a change in orientation.

A magnetometer 620(12) may be used to determine an orientation by measuring ambient magnetic fields, such as the terrestrial magnetic field. The magnetometer 620(12) may generate magnetometer data indicative of the direction, strength, and so forth of a magnetic field. The magnetometer 620(12) may be worn or carried by the user 616, mounted to the tote 618, and so forth. For example, the magnetometer 620(12) mounted to the tote 618 may act as a compass and provide information indicative of which way the tote 618 is oriented.

The sensors 620 may include other sensors 620(S) as well. For example, the other sensors 620(S) may include proximity sensors, ultrasonic rangefinders, thermometers, barometric sensors, hygrometers, biometric input devices including, but not limited to, fingerprint readers or palm scanners, and so forth. For example, the inventory management system 622 may use information acquired from thermometers and hygrometers in the facility 602 to direct the user 616 to check on delicate items 604 stored in a particular inventory location 614.

The facility 602 may include one or more access points 710 configured to establish one or more wireless networks and the network 702. The access points 710 may use Wi-Fi™, NFC, Bluetooth®, or other technologies to establish wireless communications between a device and the network 702. The wireless networks allow the devices to communicate with one or more of the inventory management system 622, the sensors 620, the tag 706, a communication device of the tote 618, or other devices.

Output devices 712 may also be provided in the facility 602. The output devices 712 are configured to generate signals which may be perceived by the user 616. The output devices 712 may include display devices 712(1), audio output devices 712(2), haptic output devices 712(3), or other output devices 712(T).

The display devices 712(1) may be configured to provide output which may be seen by the user 616 or detected by a light-sensitive detector such as an camera 620(1) or light sensor 620(7). The output may be monochrome or color. The display devices 712(1) may be emissive, reflective, or both. An emissive display device 712(1) is configured to emit light during operation. For example, a light emitting diode (LED) is an emissive visual display device 712(1). In comparison, a reflective display device 712(1) relies on ambient light to present an image. For example, an electrophoretic display 712(1)(3) is a reflective display device 712(1). Backlights or front lights may be used to illuminate the reflective visual display device 712(1) to provide visibility of the information in conditions where the ambient light levels are low.

Mechanisms of the display devices 712(1) may include liquid crystal displays 712(1)(1), transparent organic LED displays 712(1)(2), electrophoretic displays 712(1)(3), image projectors 712(1)(4), or other displays 712(1)(S). The other displays 712(1)(S) may include, but are not limited to, micro-electromechanical systems (MEMS), spatial light modulators, electroluminescent displays, quantum dot displays, liquid crystal on silicon (LCOS) displays, cholesteric displays, interferometric displays, and so forth. These mechanisms are configured to emit light, modulate incident light emitted from another source, or both.

The display devices 712(1) may be configured to present images. For example, the display devices 712(1) may comprise a pixel-addressable display. The image may comprise at least a two-dimensional array of pixels or a vector representation of an at least two-dimensional image.

In some implementations, the display devices 712(1) may be configured to provide non-image data, such as text characters, colors, and so forth. For example, a segmented electrophoretic display 712(1)(3), segmented LED, and so forth, may be used to present information such as a stock keeping unit (SKU) number. The display devices 712(1) may also be configurable to vary the color of the text, such as using multicolor LED segments.

In some implementations, display devices 712(1) may be configurable to provide image or non-image output. For example, an electrophoretic display 712(1)(3) with addressable pixels may be used to present images of text information, or all of the pixels may be set to a solid color to provide a colored panel.

One or more audio output devices 712(2) are configured to provide acoustic output. The acoustic output includes one or more of infrasonic sound, audible sound, or ultrasonic sound. The audio output devices 712(2) may use one or more mechanisms to generate the sound. These mechanisms may include, but are not limited to, the following: voice coils, piezoelectric elements, magnetorestrictive elements, electrostatic elements, and so forth. For example, a piezoelectric buzzer or a speaker may be used to provide acoustic output.

Haptic output devices 712(3) are configured to provide a signal which results in a tactile sensation to the user 616. The haptic output devices 712(3) may use one or more mechanisms such as electrical stimulation or mechanical displacement to provide the signal. For example, the haptic output devices 712(3) may be configured to generate a modulated electrical signal, which produces an apparent tactile sensation in one or more fingers of the user 616. In another example, the haptic output devices 712(3) may comprise piezoelectric or rotary motor devices configured to provide a vibration, which may be felt by the user 616.

The facility 602 may include an interface device that comprises the sensors 620, the output devices 712, or both. For example, the tote 618 may include an interface device such as a display device 712(1) and a touch sensor 620(4). In some implementations, the interface device may include hardware processors, memory, and other elements configured to present a user interface, process input to the user interface, and so forth. Users 616, associates, or both users 616 and associates may use the interface device.

Other output devices 712(T) may also be present. For example, the other output devices 712(T) may include scent/odor dispensers, document printers, 3D printers or fabrication equipment, and so forth.

The inventory management system 622 may generate user interface data, which is then used by the interface device to present the user interface. The user interface may be configured to stimulate one or more senses of the user 616 or associate. For example, the user interface may comprise visual, audible, and haptic output.

Figure 8:
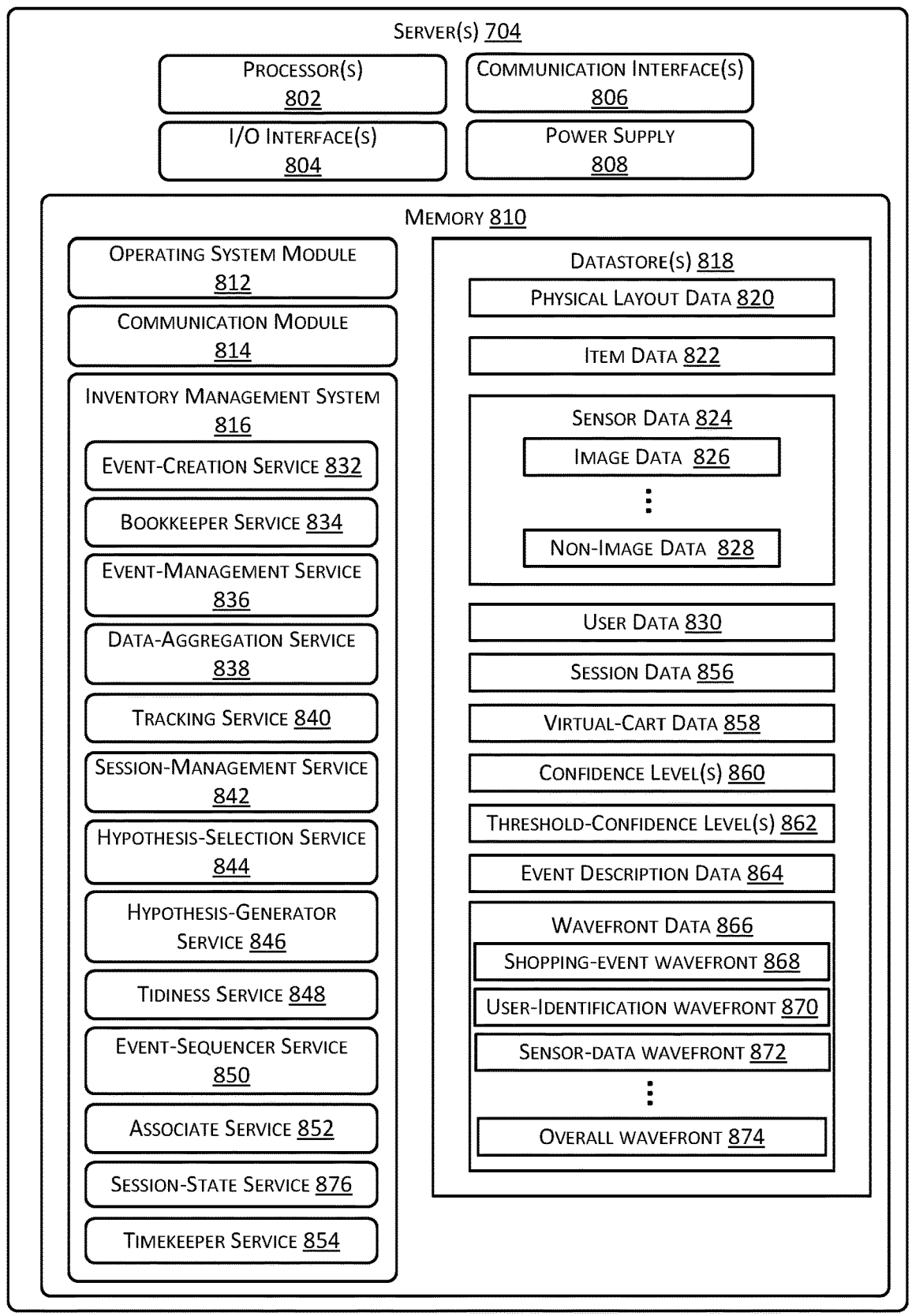
FIG. 8 illustrates a block diagram of one or more servers configured to support operation of the facility. As illustrated, the servers may host an inventory management system configured to maintain the state of the virtual shopping carts.

FIG. 8 illustrates a block diagram 800 of the one or more servers 704. The servers 704 may be physically present at the facility 602, may be accessible by the network 702, or a combination of both. The servers 704 does not require end-user knowledge of the physical location and configuration of the system that delivers the services. Common expressions associated with the servers 704 may include "on-demand computing," "software as a service (SaaS)," "platform computing," "network-accessible platform," "cloud services," "data centers," and so forth. Services provided by the servers 704 may be distributed across one or more physical or virtual devices.

The servers 704 may include one or more hardware processors 802 (processors) configured to execute one or more stored instructions. The processors 802 may comprise one or more cores. The servers 704 may include one or more input/output (I/O) interface(s) 804 to allow the processor 802 or other portions of the servers 704 to communicate with other devices. The I/O interfaces 804 may comprise Inter-Integrated Circuit (I2C), Serial Peripheral Interface bus (SPI), Universal Serial Bus (USB) as promulgated by the USB Implementers Forum, RS-232, and so forth.

The servers 704 may also include one or more communication interfaces 806. The communication interfaces 806 are configured to provide communications between the servers 704 and other devices, such as the sensors 620, the interface devices, routers, the access points 710, and so forth. The communication interfaces 806 may include devices configured to couple to personal area networks (PANs), wired and wireless local area networks (LANs), wired and wireless wide area networks (WANs), and so forth. For example, the communication interfaces 806 may include devices compatible with Ethernet, Wi-Fi™, and so forth. The servers 704 may also include one or more busses or other internal communications hardware or software that allow for the transfer of data between the various modules and components of the servers 704.

The servers 704 may also include a power supply 808. The power supply 808 is configured to provide electrical power suitable for operating the components in the servers 704.

As shown in FIG. 8, the servers 704 includes one or more memories 810. The memory 810 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 810 provides storage of computer-readable instructions, data structures, program modules, and other data for the operation of the servers 704. A few example functional modules are shown stored in the memory 810, although the same functionality may alternatively be implemented in hardware, firmware, or as a system on a chip (SOC).

The memory 810 may include at least one operating system (OS) module 812. The OS module 812 is configured to manage hardware resource devices such as the I/O interfaces 804, the communication interfaces 806, and provide various services to applications or modules executing on the processors 802. The OS module 812 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Wash., USA; and so forth.

One or more of the following modules may also be stored in the memory 810. These modules may be executed as foreground applications, background tasks, daemons, and so forth.

A communication module 814 may be configured to establish communications with one or more of the sensors 620, one or more of the devices used by associates, other servers 704, or other devices. The communications may be authenticated, encrypted, and so forth.

The memory 810 may store an inventory management system 816. The inventory management system 816 is configured to provide the inventory functions as described herein with regard to the inventory management system 622. For example, the inventory management system 816 may locate movement of items 604 in the facility 602, generate user interface data, and so forth.

The inventory management system 816 may access information stored in one or more data stores 818 in the memory 810. The data store 818 may use a flat file, database, linked list, tree, executable code, script, or other data structure to store the information. In some implementations, the data store 818 or a portion of the data store 818 may be distributed across one or more other devices including other servers 704, network attached storage devices, and so forth.

The data store 818 may include physical layout data 820. The physical layout data 820 provides a mapping of physical locations within the physical layout of devices and objects such as the sensors 620, inventory locations 614, and so forth. The physical layout data 820 may indicate the coordinates within the facility 602 of an inventory location 614, sensors 620 within view of that inventory location 614, and so forth. For example, the physical layout data 820 may include camera data comprising one or more of a location within the facility 602 of an camera 620(1), orientation of the camera 620(1), the operational status, and so forth. Continuing example, the physical layout data 820 may indicate the coordinates of the camera 620(1), pan and tilt information indicative of a direction that the field of view 628 is oriented along, whether the camera 620(1) is operating or malfunctioning, and so forth.

In some implementations, the inventory management system 816 may access the physical layout data 820 to determine if a location associated with the event 624 is within the field of view 628 of one or more sensors 620. Continuing the example above, given the location within the facility 602 of the event 624 and the camera data, the inventory management system 816 may determine the cameras 620(1) that may have generated images of the event 624.

The item data 822 comprises information associated with the items 604. The information may include information indicative of one or more inventory locations 614 at which one or more of the items 604 are stored. The item data 822 may also include order data, SKU or other product identifier, price, quantity on hand, weight, expiration date, images of the item 604, detail description information, ratings, ranking, and so forth. The inventory management system 816 may store information associated with inventory management functions in the item data 822.

The data store 818 may also include sensor data 824. The sensor data 824 comprises information acquired from, or based on, the one or more sensors 620. For example, the sensor data 824 may comprise 3D information about an object in the facility 602. As described above, the sensors 620 may include an camera 620(1), which is configured to acquire one or more images. These images may be stored as the image data 826. The image data 826 may comprise information descriptive of a plurality of picture elements or pixels. Non-image data 828 may comprise information from other sensors 620, such as input from the microphones 620(5), weight sensors 620(6), and so forth.

User data 830 may also be stored in the data store 818. The user data 830 may include identity data, information indicative of a profile, purchase history, location data, images of the user 616, demographic data, and so forth. Individual users 616 or groups of users 616 may selectively provide user data 830 for use by the inventory management system 622. The individual users 616 or groups of users 616 may also authorize collection of the user data 830 during use of the facility 602 or access to user data 830 obtained from other systems. For example, the user 616 may opt-in to collection of the user data 830 to receive enhanced services while using the facility 602.

In some implementations, the user data 830 may include information designating a user 616 for special handling. For example, the user data 830 may indicate that a particular user 616 has been associated with an increased number of errors with respect to output data 626. The inventory management system 816 may be configured to use this information to apply additional scrutiny to the events 624 associated with this user 616. For example, events 624 that include an item 604 having a cost or result above the threshold amount may be provided to the associates for processing regardless of the determined level of confidence in the output data 626 as generated by the automated system.

The inventory management system 816 may include one or more of an event-creation service 832, a bookkeeper service 834, an event-management service 836, a data-aggregation service 838, a locating service 840, a session-management service 842, a hypothesis-selection service 844, a hypothesis-generator service 846, a tidiness service 848, an event-sequencer service 850, an associate service 852, a session-state service 876, and a timekeeper service 854. The event-creation service 832 may function to receive a set of sensor data indicative of an occurrence of an event within the facility 602. In response, the event-creation service 832 may initially verify that the sensor data does in fact potentially represent an event prior to taking further action. That is, the event-creation service 832 may apply one or more heuristics to the data to ensure that the sensor data is simply noise (e.g., the shaking of a shelf rather than the removal of an item) rather than an event. If the event-creation service 832 determines that the data is indicative of an event, the event-creation service 832 may create a unique identifier associated with the event and provide the identifier to the bookkeeper service 834. The bookkeeper service 834 may then create an event record indicative of the event and store the event record designated by the event identifier in a database, such as the data store 818. In some instances, the event-creation service 832, or another service may identify when a sensor "goes down"—or stops successfully sending sensor data to the inventory management system 816. In response, the service 832 or another service may store in a datastore 818 an indication that a global-blocking event is in place. Upon the sensor coming back online, or beginning to successfully send the data, the service 832 or another service may remove the indication of the global-blocking event.

In addition to the above, the event-creation service 832 may send the sensor data, a location to the sensor data, in an indication of the event to the event-management service 836. The event-management service 836 may then generate an shopping-event summary file that includes the identifier of the event (as received from the event-creation service 832) and that includes one or more fields to be filled by data-aggregation service 838. In some instances, the fields of the file may include one or more of the person(s) associated with the event (e.g., the person that picked an item, returned an item, etc.), the item(s) associated with the event (e.g., the identifier of the item(s), the quantity, etc.), and the action(s) taken with respect to the item(s) (e.g., noting that an item was picked, that an item was returned, that a user left the store, etc.). In some instances, the field indicating the person(s) associated with the event may indicate both a person (or more) that is determined to be most likely to be associated with the event as well as one or more other candidate people that may have been associated with the event. For instance, the former may be identified as having the highest confidence level in association with the event, while the latter may comprise the next "N" number of people ranked according to confidence level (or the number of "N" people having confidence levels associated with the event that is greater than a threshold).

After generating the shopping-event summary file, the event-management service 836 may provide this file (generally unfilled) to the data-aggregation service 838, potentially along with the sensor data or information indicating a network location the sensor data. The data-aggregation service 838 may then proceed to attempt to fill in the remaining fields of the file. For instance, the data-aggregation service 838 (or another service, such as the event-management service 836) may determine a time associated with the event and a location associated with the event for the purpose of determining the user most likely associated with the event. That is, the data-aggregation service 838 may analyze the sensor data to determine the time (e.g., the time range) at which the event occurred, as well as a location within the facility 602 at which the event occurred (e.g., a particular lane and/or shelf of the facility 602). The data-aggregation service 838 may then provide an indication of the time and location of the event to the locating service 840.

The locating service 840, meanwhile, functions to locate users within the environment of the facility to allow the inventory management system 816 to assign certain events to the correct users. That is, the locating service 840 may assign unique identifiers to users as they enter the facility and, with the users' consent, may locate the users throughout the facility 602 over the time they remain in the facility 602. As discussed above, the locating service 840 may perform this locating using sensor data 824, such as the image data 826. For example, the locating service 840 may receive the image data 826 and may use facial-recognition techniques to identify users from the images. After identifying a particular user within the facility, the locating service 840 may then locate the user within the images as the user moves throughout the facility 602. Further, should the locating service 840 temporarily "lose" a particular user, the locating service 840 may again attempt to identify the users within the facility based on facial recognition, and/or using other techniques such as voice recognition, or the like.

Therefore, upon receiving the indication of the time and location of the event in question, the locating service 840 may query the data store 818 to determine which one or more users were at or within a threshold distance of the location of the event at the particular time of the event. Further, the locating service 840 may assign different confidence levels to different users, with the confidence levels indicating how likely it is that each corresponding user is the user that is in fact associated with the event of interest. In some instances, the locating service 840 returns, to the data-aggregation service 838, an identity of the user having the highest confidence level with respect to the event, as well as one or more additional identities of users having lower confidence (e.g., confidence levels that are less than the highest level but above a threshold confidence level). In response to receiving this information, the data-aggregation service 838 may fill out the corresponding portions of the shopping-event summary form. That is, the data-aggregation service 838 may indicate the identity of the user associated with the user determined to most likely be associated with the event. In some instances, the data-aggregation service 838 may also indicate, on the shopping-event summary filed the identities of the other users determined to be candidates for the event.

After receiving the user identities from the locating service 840, the data-aggregation service 838 may attempt determine the identity of any users associated with a session of the user associated with the event as well as the identities of any users associated with a session of the candidate users. To do so, the data-aggregation service 838 may send indications of the identities of the user and the candidate user(s) to a session-management service 842. The session-management service 842 may function to identify users within the facility 602 that are to be treated as related to one another for the purpose of determining the occurrence of events. For instance, the session-management service 842 may determine that three people that walk into the store together are to be associated with a particular session (denoted by a particular session identifier). Additionally or alternatively, the session-management service 842 may determine that two users are family members and, thus, are to be associated with a common session when they are within the same facility 602 at the same time-of-day. After making these determinations, the session-management service 842 may then store an indication of the respective sessions in the data store 818 as session data 856. The session data 856 may identify which users are associated with which sessions.

In other instance, a session may comprise two user identifiers that, while unique relative to one another, are actually associated with the same user. For instance, envision that the locating service 840 locates a particular user but loses track of the user while the user remains in the facility. Thereafter, the locating service 840 begins locating a user (the same particular user). While the user may comprise the same user, the locating service 840 may simply create a new user identifier for the newly located individual, being initially unaware that it is in fact the same user. Therefore, when the locating service 840 determines that the user is in fact the particular user, the session-management service may 842 associate the new user identifier with the session identifier to which the initial user identifier of the particular user was associated.

Upon receiving the user identitie(s), the session-management service 842 may determine any sessions that the users are a part of and may return respective identities of any other users that are associated with those particular sessions. The session-management service 842 may then return this information back to the data-aggregation service 838. The data-aggregation service 838 may then acquire, from the data store 818, virtual cart data 858 for these users. That is, the data-aggregation service 838 may acquire: (1) the current state of the virtual shopping cart for the user determined to most likely be associated with the event, (2) the current state of the virtual shopping cart for the candidate users, and (3) the current state of the virtual shopping cart for other users associated with the respective session of the users from (1) and (2).

In addition, the data-aggregation service 838 may request, from the hypothesis-selection service 844, an indication of a particular hypothesis generator to call of determining the information regarding the item(s) associated with the event and the actions likely taken. In response, the hypothesis-selection service 844 may select which hypothesis generator of multiple hypothesis-generator should be used by the data-aggregation service 838 to determine the outcome of the event. For instance, the service 844 may send an indication of a network location (e.g., a uniform resource locator (URL) address) to the data-aggregation service 838. In some instances, the service 844 make this selection based on one or more parameters associated with the event, such based on an attribute of the sensor data. In one instance, the service 844 selects a particular hypothesis generator based on an attribute of the sensor data, such as which sensor(s) provided the sensor data.

Upon receiving the network location of the selected hypothesis generator, the data-aggregation service 838 may provide the sensor data (or information for obtaining the sensor data) and the current states of the applicable virtual shopping carts (or information for obtaining the virtual carts) to the hypothesis-generator service 846. In some instances, the hypothesis-generator service 846 stores or otherwise has access to multiple different hypothesis generators, as discussed immediately above. Each hypothesis generator, meanwhile, may function to algorithmically determine information regarding an event based, such as the item(s) associated with the event, the actions taken with respect to the event, and the like. In some instances, the hypothesis-generator service 846 may also make this determination with reference to a state of the location of the event at the time of the event. For example, the hypothesis-generator service 846 may inquire to the tidiness service 848 whether the shelf or other location associated with the event was "tidy" or "untidy" at the time of the event. That is, the tidiness service 848 may maintain, for respective shelves or other locations over time, an indication of whether a particular shelf includes only the items it is supposed to include (e.g., only cans of peaches on a peach shelf) or whether it contains one or more other items that is not designated for that shelf or location (e.g., the peach shelf including a jar of green beans). Based on analysis of the cart contents, the identified user(s), the tidiness of the location of the event at the time of the event, and potentially other factors, the selected hypothesis generator may analyze the sensor data in view of current contents of the user most likely to be associated with the event to determine what occurred during the time associated with the event. As described above, the result may be that a user picked a particular item, returned a particular item, or the like. In some instances, the hypothesis generator comprises one or more models that have been trained using known data. For instance, the models may be trained using input sensor and an indication of the actual items picked, returned, or the like. After training each respective model, the hypothesis generator may be used to generate a respective outcome of the respective event. That is, the hypothesis generator may compare the one or more models to incoming sensor data to determine the most likely outcome, as well as probabilities associated with other potential outcomes.

The hypothesis-generator service 846 may then provide an indication of the item(s) and the corresponding action(s) back to the data-aggregation service 838. In addition, the hypothesis-generator service 846 may calculate, and provide back to the data-aggregation service 838, a confidence level associated with the item, a confidence level associated with the action, a confidence level associated with both, or the like. In addition, if the hypothesis generator determined that the shelf or other location associated with the event changed from tidy to untidy (or vice versa) based on its analysis, then the hypothesis-generator service 846 may provide this indication to the data-aggregation service 838.

The data-aggregation service 838 may then update the shopping-event summary file to indicate the item(s), action(s), and confidence values and may send the now-completed file back to the event-management service 836. The event-management service 836 may then update the data store 818 to indicate the item(s), action(s), and confidence level(s). For instance, the event-management service 836 may store the confidence level(s) 860 in the data store 818 and may update the virtual-cart data 858 associated with the user determined to be associated with the event. In addition, the event-management service 836 may also send the completed event-summary file including the identity of the user and the indication of the item and the action taken with respect to the item to an event-sequencer service 850 that maintains a timeline of events that occur within the facility. The event-sequencer service 850 may determine whether the event is out-of-order which respect to other processed events.

FIG. 8 illustrates that information regarding a particular event may be stored as event description data 864 in one of the data stores 818. Additionally, if the data-aggregation service 838 indicated that the shelf or other location associated with the event has changed from tidy to untidy (or vice versa), the event-management service 836 may send an indication to the tidiness service 848, which may update its database.

Finally, the event-management service 836 may send an indication to the bookkeeper service 834 to indicate that the event, identified by its unique identifier, is now complete. In response, the bookkeeper service 834 may update the event record in the data store 818 to indicate that the event has been completed.

The associate service 852, meanwhile, may monitor the outcome of the event to determine whether to take further action on the event. That is, the associate service 852 may compare the confidence level associated with a particular completed event to a threshold-confidence level 862 to determine whether human confirmation is needed regarding the outcome of the event. If the confidence level for the event as determined by the hypothesis-generator service 846 is greater than the threshold-confidence level 862, then the associate service 852 may an indication that the event is complete to the bookkeeper service 834. Having now received an indication of completion from both the event-management service 836 and the associate service 852, the bookkeeper service 834 may now mark the outcome of the event as complete and determinative.

If, however, the associate service 852 determines that the confidence level of the event is less than the threshold-confidence level 862, then the associate service 852 may initiate a process for human involvement regarding the outcome of the event. For instance, the associate service 852 may send the sensor data or information for obtaining the sensor data to one or more devices of human associates. These associates may analyze the data (e.g., watch a video clip, etc.) and provide output data indicative of the result of the event (e.g., the item involved, the action taken, etc.). The associate service 852 may then receive this output data and, if the output data differs from the results of the previous event, sends a request to generate a new event to the event-creation service 832, which creates and sends a new event identifier to the bookkeeper service. The event-creation service 832 may also send an indication of the new event to the event-management service 836, which may generate a new shopping-event summary form, in this instance filled out with the output data provided by the associate service 852. The event-management service 836 may also send a request to cancel the previous event record, identified with its unique identifier, to event-sequencer service 850 and may undo the previous update to the state of the virtual-cart data 858. The output data of the new event, meanwhile, may result in the updating of a different virtual cart, the same virtual cart in a different manner, and/or the like.

The session-state service 876 may maintain information associated with a session of one or more users, sometimes known as a "shopping trip". The session-state service 876 may generate an indication of a particular shopping trip in response to receiving an indication of the session from the session-management service 842. Further, the session-state service 876 may receive an indication of the ending of a session from the session-management service 842 upon, for instance, one or more users of the session exiting the facility. Upon receiving an indication of the ending of the session-state service 876 may pull one or more state-invariant times from the timekeeper service 854 to determine whether or not the session can be closed (e.g., whether the payment instrument of the user associated with the session may be charged, whether a receipt may be generated, etc.).

In some instances, after receiving one or more of the state-invariant times from the timekeeper service 854, the session-state service 876 may determine whether the session may be closed by comparing a timestamp associated with the exit of the user(s) of the session to one or more timestamps of the one or more state-invariant times. In some instances, as described below, the state-invariant times may include an overall state-invariant time that is the smallest (i.e., oldest) timestamp of one or more individual state-invariant times. In this instance, the session-state service 876 may compare the timestamp of the user's exit to the timestamp of the overall state-invariant time. If the former timestamp is smaller (i.e., older) than the latter state-invariant time, then the session-state service 876 may initiate closing of the session. This may include querying the data store 818 for the virtual-cart data 858 associated with the session, potentially along with information regarding a payment instrument of the user of the session, and initiating a payment request for payment of the items represented by the virtual-cart data 858. In addition, a receipt may be generated and sent to a device associate with a user associated with the session.

If, however, the timestamp associated with exit of the user(s) of the session is greater (i.e., more recent) than the timestamp of the current overall state-invariant time, then the session-state service 876 may refrain from finalizing the session. That is, the session-state service may wait until the current overall state-invariant time "moves past" the time of exit of the user(s). That is, the session-state service 876 may continue to periodically poll the timekeeper service 854 to determine the timestamp of the current overall state-invariant time and may request to close the session upon determining that the timestamp of the current overall state-invariant time passes the timestamp of the user's exit.

The timekeeper service 854 may store, as state-invariant-time data 866, one or more current state-invariant times. The state-invariant-time data 866 may comprise a shopping-event state-invariant time 868, a customer-identification state-invariant time 870, sensor-data state-invariant time 872, an overall state-invariant time 874, and, potentially one or more other state-invariant times.

As noted above, however, events that occur within the facility may affect the processing and results of other events in the facility. For instance, envision that sensor data in the facility indicates that a return of an item has occurred at 2:00 pm and that a customer leaves the facility at 2:02 pm. If the return that occurred at 2:00 pm has not been resolved (via identification of the item and the customer that returned the item) by 2:02 pm, then it is possible that finalizing the transaction with the exiting customer may result in an incorrect transaction. That is, if that particular user was the user that in fact returned the item, then at the time of the exit of the user the virtual cart of the user will not be accurate, given that an identifier of the item will not have been removed from the virtual cart of the user. Therefore, it is possible that the payment instrument of the user will be charged for the item incorrectly.

To prevent such errors, the timekeeper service 854 stores one or more indications the furthest progression in time of events where there are no previous unprocessed or outstanding events. Ideally, the current state-invariant time(s) will progress forward in time, but in some instances may go backwards in time. In the example from above, when an event record associated with the return of the item at 2:00 pm is created, a current state-invariant time will not progress past this time until this event is processed successfully. Therefore, when the user exits the facility at 2:02 pm, the transaction with the user will not be finalized until the event is processed and, thus, the current state-invariant time advances past 2:02—the time of exit.

In some instances the timekeeper service 854 may store indications of multiple different state-invariant times, each representing a most-recent time at which all events processed by a particular service have been processed. For example, the timekeeper service 854 may determine a shopping-event state-invariant time 868, a user-identification state-invariant time 870, a sensor-data state-invariant time 872, an overall state-invariant time 874, and/or the like. The shopping-event state-invariant time 868 represents the furthest progression in time of shopping events (e.g., take, return, etc.) where there are no previous unprocessed or outstanding shopping events. For example, the current shopping-event state-invariant time 868 may represent a most-recent time prior to which no shopping events need to be processed. For instance, if all events prior to 2:00 pm have been processed (e.g., associated with a high-confidence result) but a pick or return at 2:00 pm has yet to be processed (e.g., because it is not associated with a result, because it is associated with a low-confidence result, or the like), then the current shopping-event state-invariant time 868 may comprise 1:59 pm (on a particular day, month, and year).

The user-identification state-invariant time 870, meanwhile, represents the furthest progression in time of user entry/exit events where there are no previous unprocessed or outstanding events. For example, the current user-identification state-invariant time 870 may represent a most-recent time prior to which no entry or exit events need to be processed. For instance, if all users that have entered and exited the facility prior to 3:00 pm have been identified (e.g., the user has been identified with a high-confidence result) but a user that entered (or exited) the facility at 3:00 pm has yet to be identified (e.g., because it is not associated with a result, because it is associated with a low-confidence result, or the like), then the current user-identification state-invariant time 870 may comprise 2:59 pm (on a particular day, month, and year).

The sensor-data state-invariant time 872, meanwhile, represents the furthest progression in time where there are no previous unprocessed or outstanding sensor-data events. That is, this state-invariant time 872 represents a time at which all sensor data ingested by the system has been successfully received and stored at the appropriate service. For example, the current sensor-data state-invariant time 872 may represent a time just prior to the most-recent time at which certain sensor data has not been successfully received by a receiving service.

The overall state-invariant time 874, meanwhile, may represent the earliest-in-time state-invariant time of each of the other state-invariant times. For instance, if the timekeeper service 854 stores an indication of a shopping-event state-invariant time 868, a user-identification state-invariant time 870, and a sensor-data state-invariant time 872, the overall state-invariant time 874 may comprise the earliest timestamp of each of these corresponding timestamps. In some instances, transactions with customers may only be finalized if the request to finalize the transaction occurs prior to the overall state-invariant time 874. For instance, if an overall state-invariant time 874 corresponds to a timestamp of 12:45 pm on Jan. 1, 2017, transactions may be finalized for users that exit prior to 12:45 pm on Jan. 1, 2017 but not after. For users that exit after that time, their transactions may be finalized when the current (overall) state-invariant time 874 advances past each respective user's time of exit. For instance, if a user exits at 12:48 pm when the current state-invariant time 874 stands at 12:45 pm, the transaction with the user may be finalized only upon the current state-invariant time 874 being updated to 12:48 pm or later.

As noted above, the timekeeper service may store one or more state-invariant times, with the overall state-invariant time 874 representing the earliest-in-time state-invariant time of each of the other state-invariant times. Further, the session-state service 876 may determine whether or not a user may be checked out by determining whether the overall state-invariant time 874 is after an exit time of a user.

In other instances, however, the session-state service 876 of the inventory management system 816 may determine whether a user may be checked out using the techniques described above with reference to FIGS. 1-5B. That is, upon receiving an indication that a user has exited the facility, the session-state service 876 may determine whether a global-blocking event currently exists, whether the user is associated with a low-confidence event, and/or whether the user is a candidate user for an unresolved event. In some instances, if there is no global-blocking event at the time of exit, if the user is not associated with any low-confidence events, and if the user is not a candidate user for an unresolved event then the session-state service 876 may proceed to check out the user by, for example, charging a payment instrument associated with the profile of the user and generating receipt data for the user.

The processes discussed herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device)

to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   receiving, from one or more sensors, first sensor data indicative of a user entering a facility at a first time;
   receiving, from the one or more sensors, second sensor data indicative of the user interacting with an item from an inventory location in the facility;
   updating virtual-cart data associated with the user based at least in part on receiving the second sensor indicative of the user interacting with the item;
   receiving, from the one or more sensors, third sensor data indicative of the user exiting the facility at a second time;
   determining, by one or more processors, that the user is a candidate user for an unresolved event occurring at the facility between the first time and the second time, the unresolved event representing an event occurring at the facility that is associated with more than one candidate user;
   refraining from finalizing a transaction for the user based at least in part on determining that more than one candidate user is associated with the unresolved event;
   determining, by the one or more processors, that the user is no longer a candidate user for the unresolved event; and
   causing a payment instrument of the user to be charged at least partly in response to determining that the user has exited the facility and that the user is no longer a candidate user for the unresolved event.

2. The method as recited in claim 1, further comprising determining that there are no events prohibiting finalizing a transaction for the user, wherein determining that there are no events prohibiting finalizing the transaction for the user comprises:
   determining that there is no global-blocking event in place at the second time; and
   determining that each event associated with the user is associated with a confidence level that is greater than a threshold.

3. The method as recited in claim 1, further comprising generating receipt data based at least in part on the virtual cart data associated with the user and, prior to generating receipt data:
   receiving fourth sensor data indicative of a second item being removed from a second inventory location in the facility;
   determining that the user was within a threshold distance of the second inventory location at a third time associated with the second item being removed from the second inventory location;
   storing an indication that the user is a candidate user to associate with an event corresponding to the second item being removed from the second inventory location;
   determining, prior to the second time, that another user removed the second item from the second inventory location; and
   removing, prior to the second time, the indication that the user is the candidate user to associate with the event corresponding to the second item being removed from the second inventory location.

4. The method as recited in claim 1, further comprising generating receipt data based at least in part on the virtual cart data associated with the user and, prior to generating receipt data:
   determining that at least one sensor within the facility is not functioning properly;
   storing a global-blocking event based at least in part on determining that the at least one sensor is not functioning properly, the global-blocking event precluding finalizing of transactions with users exiting the facility;
   determining, after storing the global-blocking event, that the at least one sensor is functioning properly; and
   removing, prior to the second time, the global-blocking event.

5. The method as recited in claim 1, further comprising:
   receiving fourth sensor indicative of a second user entering the facility at a third time;
   receiving fifth sensor data indicative of the second user removing a second item from a second inventory location in the facility;
   updating second virtual-cart data associated with the second user to indicate addition of a second item identifier of the second item;
   receiving sixth sensor data indicative of the second user exiting the facility at a fourth time;
   determining that the second user is a candidate user for an unresolved event occurring between the third time and the fourth time; and
   refraining, based at least in part on determining that the second user is a candidate user for an unresolved event occurring between the third time and the fourth time, from generating receipt data corresponding to the second virtual-cart data associated with the second user.

6. The method as recited in claim 1, further comprising:
receiving fourth sensor indicative of a second user entering the facility at a third time;
receiving fifth sensor data indicative of the second user removing a second item from a second inventory location in the facility;
updating second virtual-cart data associated with the second user to indicate addition of a second item identifier of the second item;
receiving sixth sensor data indicative of the second user exiting the facility at a fourth time;
determining that there is a global-blocking event in place at the fourth time, the global-blocking event precluding finalizing of transactions with users exiting the facility; and
refraining, based at least in part on determining that there is a global-blocking event in place at the fourth time, from generating receipt data corresponding to the second virtual-cart data associated with the second user.

7. The method as recited in claim 1, further comprising:
receiving fourth sensor data indicative of a second user entering the facility at a third time;
receiving fifth sensor data indicative of a second item being removed from a second inventory location in the facility;
determining, with a confidence level that is less than a threshold confidence level, that the second user removed the second item from the second inventory location;
storing an indication that the second user is associated with a low-confidence event;
receiving sixth sensor data indicative of the second user exiting the facility at a fourth time; and
refraining from generating receipt data corresponding to second virtual-cart data of the second user based at least in part on the indication that the second user is associated with the low-confidence event.

8. The method as recited in claim 7, further comprising, after refraining from generating receipt data:
analyzing the fifth sensor data to determine that a third user removed the second item from the second inventory location;
removing the indication that the second user is associated with a low-confidence event; and
generating receipt data corresponding to the second virtual-cart data of the second user.

9. A system comprising:
one or more sensors;
one or more processors; and
one or more computer-readable media storing computer-executable instructions that, when executed, cause the one or more processors to perform acts comprising:
receiving, from the one or more sensors, first sensor data indicative of a user entering a facility at a first time;
receiving, from the one or more sensors, second sensor data indicative of the user interacting with an item from an inventory location in the facility;
updating virtual-cart data associated with the user based at least in part on receiving the second sensor data indicative of the user interacting with the item;
receiving, from the one or more sensors, third sensor data indicative of the user exiting the facility at a second time;
determining, by the one or more processors, that the user is a candidate user for an unresolved event occurring at the facility between the first time and the second time, the unresolved event representing an event occurring at the facility that is associated with more than one candidate user;
refraining from finalizing a transaction for the user based at least in part on determining that more than one candidate user is associated with the unresolved event;
determining, by the one or more processors, that the user is no longer a candidate user for the unresolved event; and
causing a payment instrument of the user to be charged at least partly in response to determining that the user has exited the facility and that the user is no longer a candidate user for the unresolved event.

10. The system as recited in claim 9, wherein determining that there are no events prohibiting finalizing a transaction for the user further comprises determining, prior to generating receipt data, that there is no global-blocking event in place at the second time.

11. The system as recited in claim 9, wherein the one or more computer-readable media further store computer-executable instructions for performing acts comprising generating receipt data based at least in part on the virtual cart data associated with the user and, prior to generating receipt data:
receiving fourth sensor data indicative of a second item being removed from a second inventory location in the facility;
determining that the user was within a threshold distance of the second inventory location at a third time associated with the second item being removed from the second inventory location;
storing an indication that the user is a candidate user to associate with an event corresponding to the second item being removed from the second inventory location;
determining, prior to the second time, that another user removed the second item from the second inventory location; and
removing, prior to the second time, the indication that the user is the candidate user to associate with the event corresponding to the second item being removed from the second inventory location.

12. The system as recited in claim 9, wherein the one or more computer-readable media further store computer-executable instructions for performing acts comprising generating receipt data based at least in part on the virtual cart data associated with the user and, prior to generating receipt data:
determining that at least one sensor within the facility is not functioning properly;
storing a global-blocking event based at least in part on determining that the at least one sensor is not functioning properly, the global-blocking event precluding finalizing of transactions with users exiting the facility;
determining, after storing the global-blocking event, that the at least one sensor is functioning properly; and
removing, prior to the second time, the global-blocking event.

13. The system as recited in claim 9, wherein the one or more computer-readable media further store computer-executable instructions for performing acts comprising:
receiving fourth sensor indicative of a second user entering the facility at a third time;
receiving fifth sensor data indicative of the second user removing a second item from a second inventory location in the facility;

updating second virtual-cart data associated with the second user to indicate addition of a second item identifier of the second item;
receiving sixth sensor data indicative of the second user exiting the facility at a fourth time;
determining that the second user is a candidate user for an unresolved event occurring between the third time and the fourth time; and
refraining, based at least in part on determining that the second user is a candidate user for an unresolved event occurring between the third time and the fourth time, from generating receipt data corresponding to the second virtual-cart data associated with the second user.

14. The system as recited in claim 9, wherein the one or more computer-readable media further store computer-executable instructions for performing acts comprising:
receiving fourth sensor data indicative of a second user entering the facility at a third time;
receiving fifth sensor data indicative of the second user removing a second item from a second inventory location in the facility;
updating second virtual-cart data associated with the second user to indicate addition of a second item identifier of the second item;
receiving sixth sensor data indicative of the second user exiting the facility at a fourth time;
determining that there is a global-blocking event in place at the fourth time, the global-blocking event precluding finalizing of transactions with users exiting the facility; and
refraining, based at least in part on determining that there is a global-blocking event in place at the fourth time, from generating receipt data corresponding to the second virtual-cart data associated with the second user.

15. The system as recited in claim 9, wherein the one or more computer-readable media further store computer-executable instructions for performing acts comprising:
receiving fourth sensor data indicative of a second user entering the facility at a third time;
receiving fifth sensor data indicative of a second item being removed from a second inventory location in the facility;
determining, with a confidence level that is less than a threshold confidence level, that the second user removed the second item from the second inventory location;
storing an indication that the second user is associated with a low-confidence event;
receiving sixth sensor data indicative of the second user exiting the facility at a fourth time; and
refraining from generating receipt data corresponding to second virtual-cart data of the second user based at least in part on the indication that the second user is associated with the low-confidence event.

16. The system as recited in claim 15, wherein the one or more computer-readable media further store computer-executable instructions for performing acts comprising, after refraining from generating receipt data:
analyzing the fifth sensor data to determine that a third user removed the second item from the second inventory location;
removing the indication that the second user is associated with a low-confidence event; and
generating receipt data corresponding to the second virtual-cart data of the second user.

17. The method as recited in claim 1, further comprising generating receipt data based at least in part on causing the payment instrument of the user to be charged, wherein the payment instrument of the user is charged based at least in part on a price of items in the virtual-cart data associated with the user.

18. The system as recited in claim 9, wherein the one or more computer-readable media further store computer-executable instructions for performing acts comprising:
generating receipt data based at least in part on causing the payment instrument of the user to be charged, wherein the payment instrument of the user is charged based at least in part on a price of items in the virtual-cart data associated with the user.

19. A method comprising:
receiving, from one or more sensors, first sensor data indicative of a user entering a facility at a first time;
receiving, from the one or more sensors, second sensor data indicative of the user interacting with an item from an inventory location in the facility;
updating virtual-cart data associated with the user based at least in part on receiving the second sensor indicative of the user interacting with the item;
receiving, from the one or more sensors, third sensor data indicative of the user exiting the facility at a second time;
determining, by one or more processors, that the user is a candidate user for an unresolved event occurring at the facility between the first time and the second time, the unresolved event representing an event occurring at the facility that is associated with more than one candidate user;
refraining from finalizing a transaction for the user based at least in part on determining that more than one candidate user is associated with the unresolved event;
determining, by the one or more processors, that the user is no longer a candidate user for the unresolved event; and
causing a payment instrument of the user to be charged at least partly in response to determining that the user has exited the facility and that the user is no longer a candidate user for the unresolved event.

20. The method as recited in claim 19, further comprising:
receiving fourth sensor indicative of a second user entering the facility at a third time;
receiving fifth sensor data indicative of the second user removing a second item from a second inventory location in the facility;
updating second virtual-cart data associated with the second user to indicate addition of a second item identifier of the second item;
receiving sixth sensor data indicative of the second user exiting the facility at a fourth time;
determining that the second user is a candidate user for an unresolved event occurring between the third time and the fourth time; and
refraining, based at least in part on determining that the second user is a candidate user for an unresolved event occurring between the third time and the fourth time, from generating receipt data corresponding to the second virtual-cart data associated with the second user.

* * * * *